United States Patent
Tsuru

(10) Patent No.: US 11,438,650 B2
(45) Date of Patent: Sep. 6, 2022

(54) INFORMATION PROCESSING APPARATUS, INFORMATION PROCESSING METHOD, TRANSMISSION APPARATUS, AND TRANSMISSION METHOD

(71) Applicant: SATURN LICENSING LLC, New York, NY (US)

(72) Inventor: Takumi Tsuru, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 38 days.

(21) Appl. No.: 16/976,995

(22) PCT Filed: Mar. 15, 2019

(86) PCT No.: PCT/JP2019/010762
§ 371 (c)(1),
(2) Date: Aug. 31, 2020

(87) PCT Pub. No.: WO2019/188393
PCT Pub. Date: Oct. 3, 2019

(65) Prior Publication Data
US 2021/0006862 A1   Jan. 7, 2021

(30) Foreign Application Priority Data
Mar. 29, 2018   (JP) .............................. JP2018-064977

(51) Int. Cl.
*H04N 21/442*  (2011.01)
*G10L 15/22*  (2006.01)
(Continued)

(52) U.S. Cl.
CPC ....... *H04N 21/44218* (2013.01); *G10L 13/00* (2013.01); *G10L 15/22* (2013.01);
(Continued)

(58) Field of Classification Search
CPC ......... G10L 13/00; G10L 13/02; G10L 15/22; G10L 15/30; G10L 2015/223;
(Continued)

(56) References Cited

U.S. PATENT DOCUMENTS 10,956,006 B2   3/2021 Napolitano et al.
2008/0208589 A1   8/2008 Cross et al.
(Continued)

FOREIGN PATENT DOCUMENTS

CN   107003797   8/2017
JP   2008-301362 A   12/2008
(Continued)

OTHER PUBLICATIONS

Martin, T. et al., "The complete list of Alexa commands so far," [online] Apr. 20, 2017, CNET (CBS Interactive Inc.), Internet :<URL:https://web.archive.org/web/20170420075858/https://www.cnet.com/how-to/amazon-echo-thecomplete-list-of-alexa-commands/>, pp. 1-11.

(Continued)

*Primary Examiner* — Rong Le
(74) *Attorney, Agent, or Firm* — Richard LaPeruta

(57) ABSTRACT

The present technology relates to an information processing apparatus, information processing method, transmission apparatus, and transmission method, capable of improving the convenience of a voice AI assistance service used in cooperation with content.
The convenience of the voice AI assistance service used in cooperation with the content can be improved by providing an information processing apparatus including a control unit configured to control a timing of a voice response upon using a voice AI assistance service in cooperation with content on the basis of voice response time information indicating time suitable for the voice response to an utter- (Continued)

ance of a viewer watching the content. The present technology can be applied to a system in cooperation with a voice AI assistance service, for example.

17 Claims, 22 Drawing Sheets

(51) Int. Cl.
*G10L 15/30* (2013.01)
*G10L 13/00* (2006.01)
*H04N 21/235* (2011.01)
*H04N 21/458* (2011.01)
*H04N 21/422* (2011.01)

(52) U.S. Cl.
CPC .......... *G10L 15/30* (2013.01); *H04N 21/235* (2013.01); *H04N 21/42203* (2013.01); *H04N 21/458* (2013.01); *G10L 2015/223* (2013.01)

(58) Field of Classification Search
CPC ...... H04H 60/09; H04H 60/82; H04N 21/235; H04N 21/42203; H04N 21/439; H04N 21/44218; H04N 21/458; H04N 21/4825; H04N 21/8456
See application file for complete search history.

(56) References Cited

U.S. PATENT DOCUMENTS

| | | |
|---|---|---|
| 2008/0299894 A1 | 12/2008 | Natori et al. |
| 2012/0209916 A1 | 8/2012 | Azuma et al. |
| 2015/0382079 A1 | 12/2015 | Lister et al. |
| 2017/0206243 A1 | 7/2017 | Ono |
| 2017/0329848 A1 | 11/2017 | Goodman et al. |
| 2018/0081618 A1* | 3/2018 | McLean ............. H04N 21/8113 |
| 2019/0034542 A1* | 1/2019 | Ming ..................... G10L 15/22 |
| 2019/0104316 A1* | 4/2019 | Da Silva Pratas Gabriel ............. H04N 21/4728 |
| 2019/0273963 A1* | 9/2019 | Jobanputra ............. G10L 25/51 |
| 2019/0371329 A1* | 12/2019 | D'Souza ........... H04M 3/42204 |

FOREIGN PATENT DOCUMENTS

| | | |
|---|---|---|
| JP | 2008306426 | 12/2008 |
| JP | 2010004545 | 1/2010 |
| JP | 2011-86232 A | 4/2011 |
| JP | 2013-187781 A | 9/2013 |
| JP | 2014-153663 A | 8/2014 |
| JP | 2016-192121 A | 11/2016 |
| WO | 2017197184 | 11/2017 |
| WO | 2017197329 | 11/2017 |
| WO | 2018005334 | 1/2018 |

OTHER PUBLICATIONS

"Internet Archive: Wayback Machine", [online], Apr. 3, 2019, [retrieved on Apr. 3, 2019],Retrieved from the Internet: <URL: https://archive.org/web/>, total pages: 2.
Wayback Machine, [online], Apr. 3, 2019, [retrieved on Apr. 3, 2019], Retrieved from the Internet: <URL: https://web.archive.org/web/20170801000000*/https: //www.cnet.com/how-to/amazon-echo-the-completelist- of-alexa-commands/>, total pages: 4.
Stitcher, "Our Stitcher Alexa Skill", [online], Nov. 9, 2017, Stitcher Blog, pp. 1-7, [retrieved on Apr. 3, 2019], Retrieved from the Internet: <URL: https://medium.com/stitcherblog/ new-stitcher-alexa-skill-now-available- 712fc668d599>, total pages: 7.
International Search Report dated Apr. 23, 2019 in PCT/JP2019/010762 filed on Mar. 15, 2019, 3 pages.
Hidekazu Minami, et al., "Chat Robot Coupling Machine Responses and Social Media Comments for Continuous Conversation" 2016 IEEE International Conference on Multimedia & Expo Workshops (ICMEW), IEEE, XP032970895, Jul. 11, 2016, pp. 1-6.

* cited by examiner

INFORMATION PROCESSING APPARATUS, INFORMATION PROCESSING METHOD, TRANSMISSION APPARATUS, AND TRANSMISSION METHOD

TECHNICAL FIELD

The present technology relates to information processing apparatuses, information processing methods, transmission apparatuses, and transmission methods. In particular, the present technology relates to an information processing apparatus, information processing method, transmission apparatus, and transmission method, capable of improving the convenience of a voice AI assistance service used in cooperation with content.

BACKGROUND ART

A broadcast application that runs in conjunction with broadcast content is developed (e.g., see Patent Document 1). The use of the broadcast application makes it possible, for example, to display broadcast content-related information.

Further, the technology regarding voice recognition that analyzes the user's utterance contents is developed (e.g., see Patent Document 2). For example, this technology applied to a television set or a portable terminal device makes it possible to analyze words uttered by a user and execute processing corresponding to the utterance.

CITATION LIST

Patent Document

Patent Document 1: Japanese Patent Application Laid-Open No. 2013-187781
Patent Document 2: Japanese Patent Application Laid-Open No. 2014-153663

SUMMARY OF THE INVENTION

Problems to be Solved by the Invention

In recent years, the voice AI assistance service has been rapidly spreading. There is a case where the voice AI assistance service is used in cooperation with broadcast content or a broadcast application played back in a receiver such as television sets. In this case, the output of the response voice to the utterance of the viewer who watches the content such as broadcast content can overlap the voice of the content, which may cause interference with the viewing by the viewer. Thus, there has been a demand for a technique for improving the convenience of the voice AI assistance service by eliminating interference with the viewing by the viewer upon outputting the response voice to the viewer's utterance.

The present technology is made in view of such circumstances and is intended to improve the convenience of the voice AI assistance service used in cooperation with the content.

Solutions to Problems

An information processing apparatus according to a first aspect of the present technology includes a control unit configured to control a timing of a voice response upon using a voice AI assistance service in cooperation with content on the basis of voice response time information indicating time suitable for the voice response to an utterance of a viewer watching the content.

The information processing apparatus according to the first aspect of the present technology can be an independent device or can be an internal block that constitutes one device. In addition, an information processing method according to the first aspect of the present technology is an information processing method corresponding to the above-described information processing apparatus according to the first aspect of the present technology.

In an information processing method and an information processing apparatus according to the first aspect of the present technology, a timing of a voice response is controlled upon using a voice AI assistance service in cooperation with content on the basis of voice response time information indicating time suitable for the voice response to an utterance of a viewer watching the content.

A transmission apparatus according to a second aspect of the present technology includes a generation unit configured to generate, upon using a voice AI assistance service in cooperation with content, metadata including voice response time information indicating time suitable for a voice response to an utterance of a viewer watching the content, and a transmission unit configured to transmit the generated metadata.

The transmission apparatus according to the second aspect of the present technology can be an independent device or can be an internal block that constitutes one device. In addition, a transmission method according to the second aspect of the present technology is a transmission method corresponding to the above-described transmission apparatus according to the second aspect of the present technology.

In a transmission apparatus and a transmission method according to a second aspect of the present technology, upon using a voice AI assistance service in cooperation with content, metadata including voice response time information indicating time suitable for the voice response to an utterance of a viewer watching the content is generated, and the generated metadata is transmitted.

Effects of the Invention

According to the first and the second aspects of the present technology, it is possible to improve the convenience of the voice AI assistance service used in cooperation with the content.

Note that the advantageous effects described here are not necessarily limiting and any advantageous effect described in the present disclosure may be obtained.

MODE FOR CARRYING OUT THE INVENTION

Figure 1:
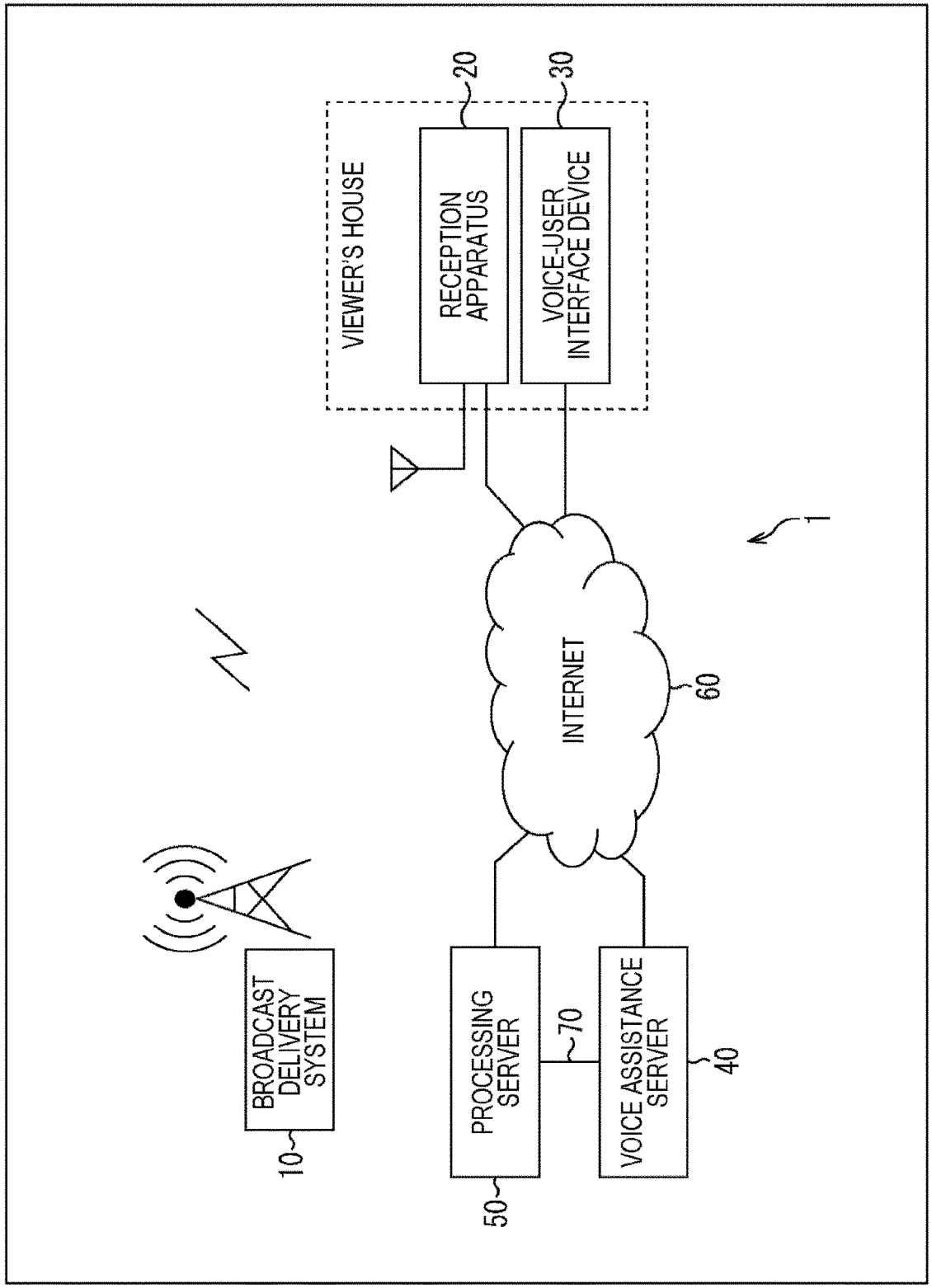
FIG. 1 is a block diagram illustrating an example of a configuration of an embodiment of a content-voice AI cooperation system to which the present technology is applied.

Embodiments of the present technology are now described with reference to the drawings. Note that the description is given in the following order.

1. Configuration of system
2. Embodiments of the present technology
(1) First embodiment: configuration for timing control of voice response based on voice response time
(2) Second embodiment: configuration for timing control of voice response based on an instruction utterance from viewer
(3) Third embodiment: configuration for timing control of voice response based on instruction utterance from viewer upon timing control of a voice response based on voice response time
3. Modifications
4. Configuration of computer <1. Configuration of System>

(Configuration of Content-Voice AI Cooperation System)

FIG. 1 is a block diagram illustrating an example of the configuration of an embodiment of a content-voice AI cooperation system to which the present technology is applied.

The content-voice AI cooperation system 1 is a system for delivering content and allows the use of a voice AI assistance service in cooperation with the delivered content.

In FIG. 1, the content-voice AI cooperation system 1 includes a broadcast delivery system 10, a reception apparatus 20, a voice-user interface device 30, a voice assistance server 40, and a processing server 50.

Further, in the content-voice AI cooperation system 1, the reception apparatus 20 and the voice-user interface device 30 installed in a viewer's house are capable of being connected to various servers such as the voice assistance server 40 and the processing server 50 installed in a data center or the like via the Internet 60 for exchanging various data.

The broadcast delivery system 10 includes one or a plurality of broadcast servers or the like. The broadcast delivery system 10 performs necessary processing on the content to be delivered and sends out a resultant broadcast signal (broadcast wave) obtained by the processing from a transmission antenna installed at a transmitting station.

The reception apparatus 20 is configured, for example, as a fixed receiver such as television sets and personal computers or as a mobile receiver such as smartphones, cellular phones, and tablet computers. The reception apparatus 20 receives and processes the broadcast signal transmitted from the broadcast delivery system 10 and plays back the delivered content (e.g., such as broadcast programs or ADs).

The voice-user interface device 30 is, for example, a voice processing device (e.g., a speaker) capable of performing wireless communication such as Bluetooth (registered trademark), wireless local area network (LAN), and cellular communication or wired communication, which is also called a smart speaker or a home agent, for example. This type of speaker is capable of, in addition to playing music, functioning as, for example, a user interface for a voice AI assistance service, or performing voice operations on an instrument such as lighting equipment or air conditioning equipment.

The voice-user interface device 30 is capable of providing a voice AI assistance service for the end-user (a viewer of content) in cooperation with a server, such as the voice assistance server 40 on the cloud side. In this description, the voice AI assistance service is, for example, a function or a service that appropriately answers or operates in response to an end-user's question or request in combination with processing such as voice recognition or natural language analysis.

The voice assistance server 40 has a function of providing voice AI assistance services, various databases, and the like. The voice assistance server 40 performs processing of providing the voice AI assistance service in response to a request from the voice-user interface device 30 and replies to the voice-user interface device 30 with the processing result (a response) via the Internet 60.

The processing server 50 cooperates with the voice assistance server 40 to perform the processing of providing the voice AI assistance service, and transmits the processing result (a response) to the voice assistance server 40 via the Internet 60 or a network 70 (e.g., a communication line such as leased lines). Moreover, the processing result obtained by the processing server 50 can be transmitted not only to the voice assistance server 40 but also to the reception apparatus 20 or the voice-user interface device 30 via the Internet 60.

The content-voice AI cooperation system 1 is configured as described above.

By the way, there is a case where a viewer makes an utterance to an application regarding content using the voice AI assistance service while watching the content such as broadcast programs or TV advertisements (commercial). In this case, a response voice to the viewer's utterance overlaps with the sound of the content such as broadcast programs, which causes to interfere with the viewing/listening of the content.

Figure 2:
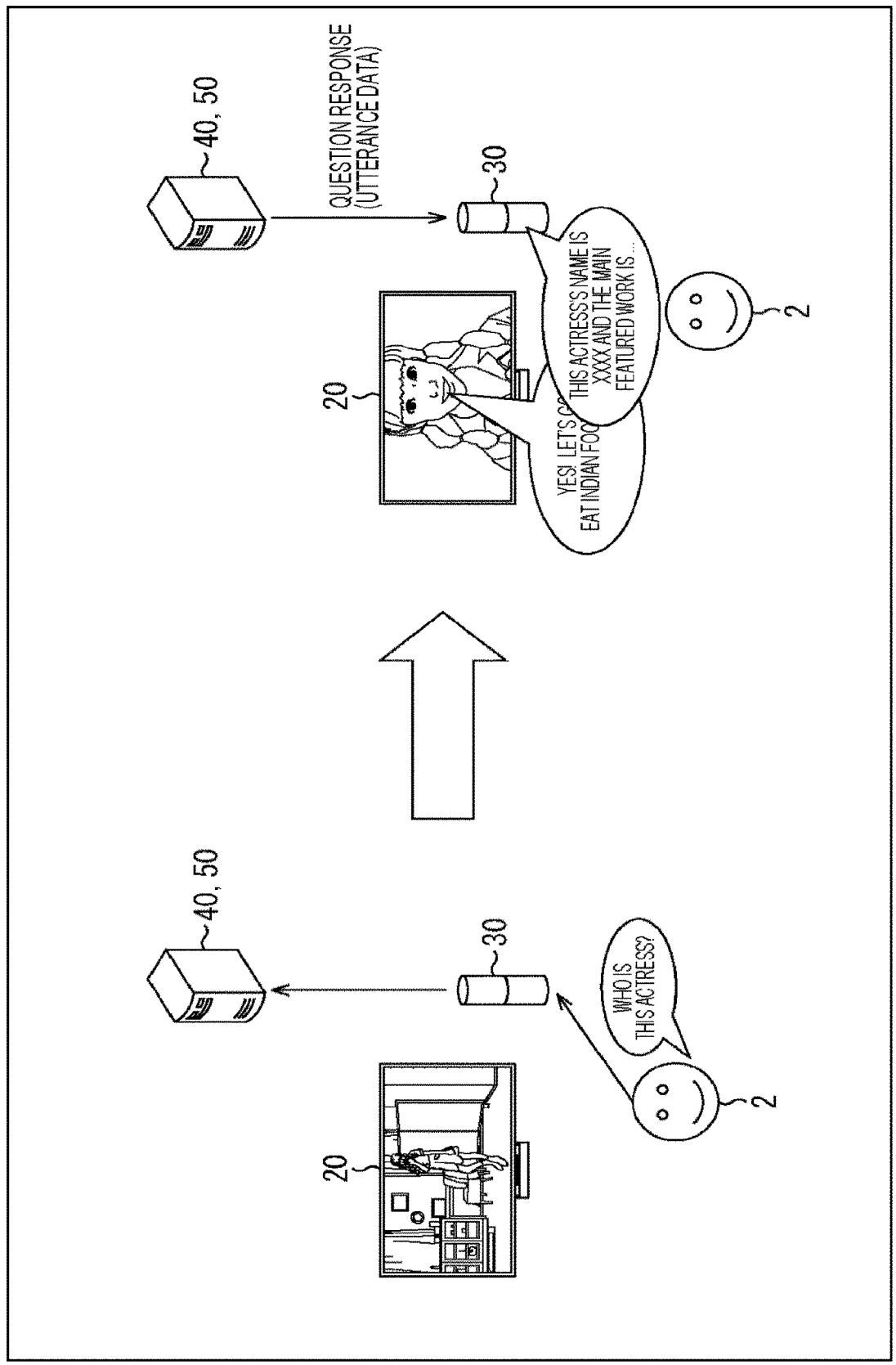
FIG. 2 is a diagram illustrating an example of the response timing of a voice AI assistance service used in cooperation with content.

For example, FIG. 2 shows a scene, in a case where the viewer 2 is watching a drama program and wants to know who is the actress appearing in a certain scene, where the viewer uses the voice AI assistance service and makes an utterance "Who is this actress?".

In this event, the voice-user interface device 30 picks up the utterance of the viewer 2 with the microphone and transmits the voice data of the utterance to the voice assistance server 40 via the Internet 60. The voice assistance server 40 performs processing in cooperation with the processing server 50 provided for each broadcast station to generate voice data for a response to the utterance and transmits the voice data to the voice-user interface device 30 via the Internet 60.

In this description, there is a case where the voice-user interface device 30 receives the voice data for the response from the voice assistance server 40 and outputs the response voice corresponding to the voice data. In this case, there is a possibility that the viewer 2 is unable to listen to the utterance of the actress utterance because the output response voice overlaps in timing with the actress's utterance in the drama program that the viewer 2 is watching using the reception apparatus 20.

In the example of FIG. 2, a response voice of "This actress's name is XXXX and the main featured work is . . . " overlaps with the words "Yes! Let's go eat Indian food today!" uttered by the actress. In this way, depending on the timing of the voice response, the voice AI assistance service may interfere with the viewing/listening of the drama program by the viewer 2.

Thus, in using the voice AI assistance service in cooperation with content such as broadcast programs, there is a demand for improving the convenience of the voice AI assistance service by causing the voice response to the utterance of the viewer to be the timing desired by the viewer.

Thus, the present technology allows the timing of the voice response to be controlled on the basis of the information indicating the timing suitable for the voice response to the viewer's utterance (hereinafter referred to as voice response time information). Thus, it is possible to improve the convenience of voice AI assistance services used in cooperation with content such as broadcast programs. First to third embodiments as modes of the present technology are now described.

2. Embodiments of the Present Technology

(1) First Embodiment

A configuration for controlling the timing of voice response on the basis of the voice response time information acquired via communication or via broadcasting is first described as a first embodiment with reference to FIGS. 3 to 13.

(First Example of Configuration)

Figure 3:
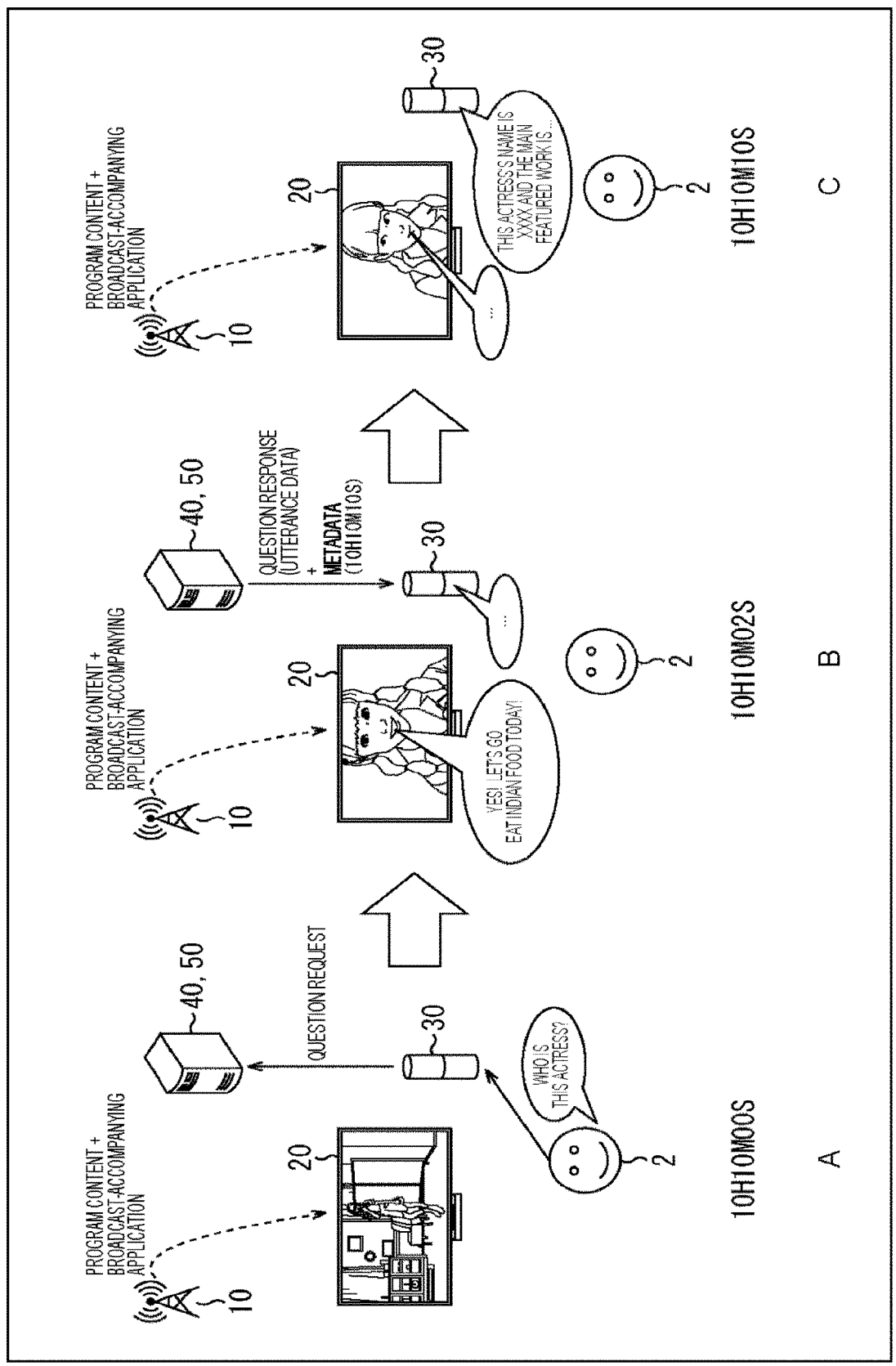
FIG. 3 is a diagram illustrating a first example of the configuration of a first embodiment.

FIG. 3 is a diagram illustrating a first example of the configuration of a first embodiment.

FIG. 3 shows the procedure of processing in accordance with the progress of the broadcast program viewed by the viewer 2 in time series using portions A to C in FIG. 3.

At 10:10:00 (10 h:10 m:00 s), when the viewer 2 makes an utterance "Who is this actress?" while watching a drama program, the user interface device 30 picks up the utterance of the viewer 2 with the microphone, and transmits the voice data of the utterance to the voice assistance server 40 as a question request (portion A in FIG. 3).

The voice assistance server 40 generates voice data of a response to an utterance by performing processing in cooperation with the processing server 50 provided by the broadcast station that produced the drama program being viewed. In addition, in this description, together with the voice data for the response, the voice response time information indicating the timing suitable for the voice response is generated as the voice response timing metadata. Then, the voice response timing metadata (the voice response time information) is transmitted to the user interface device 30 together with the voice data for the response (portion B in FIG. 3).

At 10:10:02 (10 h:10 m:02 s), the user interface device 30 receives the voice response timing metadata together with the voice data for the response from the voice assistance server 40, but the time (time of day) indicated by the voice response time information is 10:10:10, so it waits until that time (time of day) (portion B in FIG. 3). In other words, in the drama program being viewed, a conversation scene occurs at about 10:10:02, and so the timing of the voice response is shifted to prevent it from overlapping with the actress's utterance "Yes! Let's go eat Indian food today!", for example.

Then, when the time reaches 10:10:10, the time (time of day) being the time indicated by the voice response time information, the user interface device 30 outputs the response voice "The name of this actress is XXXX and the main featured work is . . . " on the basis of the voice data for the response held in a buffer during waiting (portion C in FIG. 3). In this event, the drama program being viewed is not a scene of conversation, so it is less likely that the viewer 2 interferes with the viewing of the drama program.

In this way, it is possible for the user interface device 30 to perform a voice response at the timing suitable for a voice response, that is, at the time that does not involve an interference with the viewing, such as a break in conversation from the development of the program being viewed. This is performed on the basis of the voice response timing metadata (the voice response time information) obtained via communication. This makes it possible for the viewer 2 to listen to the response voice (information to want to know) without interfering with the viewing of the program.

Moreover, the description is given of the case of using the actual time as an example for easy understanding of the description in FIG. 3. However, practically, it is possible to control the timing of the voice response using the media time of the content being played in the reception apparatus 20.

(First Example of Detailed Configuration of Each Device)

Figure 4:
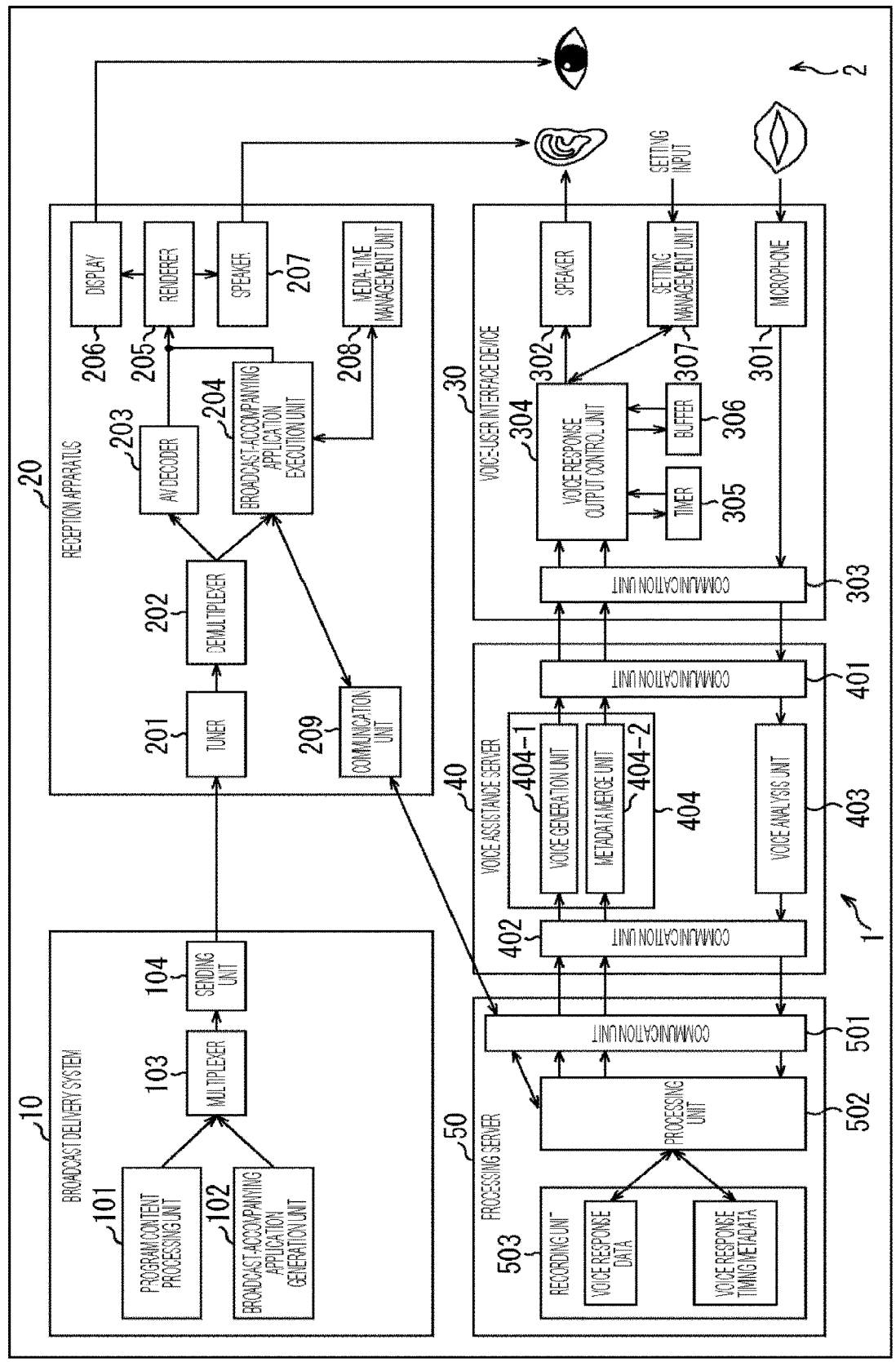
FIG. 4 is a block diagram illustrating a first example of a detailed configuration of each device according to the first embodiment.

FIG. 4 is a block diagram illustrating a first example of a detailed configuration of each device according to the first embodiment.

FIG. 4 shows an example of the configurations of the broadcast delivery system 10 provided on the broadcast station side (transmission side) and the reception apparatus 20 provided on the local side (reception side). In addition, FIG. 4 shows an example of the configuration of the voice-user interface device 30 provided on the local side and the configurations of the voice assistance server 40 and the processing server 50 provided on the cloud side.

In FIG. 4, the broadcast delivery system 10 includes a program content processing unit 101, a broadcast-accompanying application generation unit 102, a multiplexer 103, and a sending unit 104.

The program content processing unit 101 performs necessary processing (e.g., such as AV encoding) on the content input therein and supplies the result to the multiplexer 103. Moreover, the content is, for example, a broadcast program, advertising, or the like and is acquired from an external server, a camera, a recording medium, or the like.

The broadcast-accompanying application generation unit 102 generates a broadcast-accompanying application and supplies it to the multiplexer 103. In this description, the broadcast-accompanying application is an application executed in conjunction with the content such as broadcast programs.

The multiplexer 103 multiplexes the content supplied from the program content processing unit 101 and the broadcast-accompanying application supplied from the broadcast-accompanying application generation unit 102 and supplies the resulting stream to the sending unit 104.

The sending unit 104 performs necessary processing (e.g., such as error correction coding or modulation processing) on the stream supplied from the multiplexer 103, and transmits the resulting broadcast signal (broadcast stream) through a transmitting antenna installed at a transmitting station.

In FIG. 4, the reception apparatus 20 includes a tuner 201, a demultiplexer 202, an AV decoder 203, a broadcast-accompanying application execution unit 204, a renderer 205, a display 206, a speaker 207, a media-time management unit 208, and a communication unit 209.

The tuner 201 receives a broadcast signal (broadcast stream) transmitted from the broadcast delivery system 10 through a receiving antenna installed in a viewer's house or the like, performs necessary processing (e.g., such as demodulation processing or error correction decoding) on it, and supplies the resulting stream to the demultiplexer 202.

The demultiplexer 202 separates the stream supplied from the tuner 201 into streams of video, audio, and broadcast-accompanying application. The demultiplexer 202 supplies the video and audio streams to the AV decoder 203 and supplies the broadcast-accompanying application stream to the broadcast-accompanying application execution unit 204.

The AV decoder 203 decodes the video stream supplied from the demultiplexer 202 and supplies the result to the renderer 205. In addition, the AV decoder 203 also decodes the audio stream supplied from the demultiplexer 202 and supplies the result to the renderer 205.

The renderer 205 performs rendering on the video data supplied from the AV decoder 203 and causes the resulting video to be displayed on the display 206 such as a liquid crystal display (LCD) or organic light-emitting diode (OLED).

Further, the renderer 205 performs rendering on the voice data supplied from the AV decoder 203 and outputs the resulting audio through the speaker 207. This allows, in the reception apparatus 20, the video of the content such as the broadcast program to be displayed on the display 206 and the audio synchronized with the video to be output through the speaker 207.

The broadcast-accompanying application execution unit 204 is, for example, a browser compatible with HTML5, JavaScript (registered trademark), or the like. The broadcast-accompanying application execution unit 204 executes the broadcast-accompanying application on the basis of the application data supplied from the demultiplexer 202 and supplies the video data to the renderer 205.

The renderer 205 performs rendering on the video data supplied from the broadcast-accompanying application execution unit 204 and causes the resulting video to be displayed on the display 206. This allows, in the reception apparatus 20, the video of the broadcast-accompanying application that is in conjunction with the content such as the broadcast program to be displayed on the display 206.

The media-time management unit 208 manages the media time of the content being played in the reception apparatus 20. The media-time management unit 208 supplies the current media time of the content being played in response to an inquiry from the broadcast-accompanying application execution unit 204.

The communication unit 209 is configured as a communication module compatible with wireless communication such as wireless LAN or cellular communication, or wired communication. The communication unit 209 communicates with the processing server 50 (the communication unit 501 thereof) via the Internet 60 in accordance with a predetermined communication scheme to exchange various data. In this description, for example, the communication is performed using WebSocket or the like, and the communication unit 209 is capable of sending the current media time supplied from the broadcast-accompanying application execution unit 204 to the processing server 50 (the communication unit 501 thereof).

In FIG. 4, the voice-user interface device 30 includes a microphone 301, a speaker 302, a communication unit 303, a voice response output control unit 304, a timer 305, a buffer 306, and a setting management unit 307.

The microphone 301 picks up the utterance of the viewer 2 and supplies the voice data of the utterance to the communication unit 303.

The communication unit 303 is configured as a communication module, which is compatible with wireless communication such as wireless LAN and cellular communication, or wired communication.

The communication unit 303 transmits the voice data of the utterance supplied from the microphone 301 to the voice assistance server 40 via the Internet 60. In addition, the communication unit 303 receives the voice data for the response and the voice response timing metadata (the voice response time information) transmitted from the voice assistance server 40 via the Internet 60 and supplies them to the voice response output control unit 304. Moreover, although it will be described in detail later, the voice data for the response and the voice response timing metadata are included and sent in the second response message.

The voice response output control unit 304 is supplied with the voice data for the response and the voice response timing metadata from the communication unit 303. The voice response output control unit 304 supplies the voice data for the response to the speaker 302 at the timing corresponding to the time indicated by the voice response time information on the basis of the voice response timing metadata acquired via communication.

In this description, the time indicated by the voice response time information is passed to the timer 305 from the voice response output control unit 304 to measure the time, and the buffer 306 temporarily holds the voice data for the response until the timing suitable for the voice response is reached. Then, when the timing suitable for the voice response is reached, the voice response output control unit 304 reads the voice data for the response temporarily held in the buffer 306 and supplies it to the speaker 302.

The speaker 302 outputs a response voice corresponding to the voice data for the response supplied from the voice response output control unit 304.

The setting management unit 307 makes various settings according to the setting input from the viewer 2. In this description, for example, in outputting the response voice, the settings or the like are made of the timing control of whether to wait until the timing suitable for the voice response. Moreover, in this description, the setting input can be received by the operation input of the viewer 2 with a button or a touch panel (not shown) or can be received the voice input of the viewer 2 with the microphone 301.

In FIG. 4, the voice assistance server 40 includes a communication unit 401, a communication unit 402, a voice analysis unit 403, and a message generation unit 404.

The communication unit 401 receives the voice data of the utterance transmitted from the voice-user interface device 30 via the Internet 60 and supplies it to the voice analysis unit 403.

The voice analysis unit 403 analyzes the voice data of the utterance supplied from the communication unit 401 and converts the voice data of the utterance into text data. The voice analysis unit 403 supplies a request message corresponding to the analysis result of the voice data of the utterance to the communication unit 402.

The communication unit 402 transmits the request message supplied from the voice analysis unit 403 to the processing server 50 via the network 70. In addition, the communication unit 402 receives a first response message transmitted from the processing server 50 via the network 70 and supplies the first response message to the message generation unit 404.

The message generation unit 404 converts the first response message supplied from the communication unit 402 to generate a second response message for responding to the voice-user interface device 30, and supplies it to the communication unit 401.

Moreover, in this description, for the convenience of description, the response message transmitted from the processing server 50 and received by the voice assistance server 40 differs from the response message transmitted from the voice assistance server 40 and received by the voice-user interface device 30. For the sake of distinction between them, the former is referred to as the first response message, and the latter is referred to as the second response message.

The message generation unit 404 includes a voice generation unit 404-1 and a metadata merge unit 404-2. In addition, the first response message includes voice response data and the voice response timing metadata (the voice response time information).

The voice generation unit 404-1 converts the voice response data included in the first response message sent from the processing server 50 into the voice data for the response. The metadata merge unit 404-2 merges the voice response timing metadata (the voice response time information) included in the first response message sent from the processing server 50 with the second response message including the voice data for the response.

In this way, in the message generation unit 404, the voice generation unit 404-1 and the metadata merge unit 404-2 cause the first response message (e.g., HTTP response data) including the text-format data (voice response data and voice response timing metadata) to be processed. Thus, the second response message (e.g., HTTP response) including voice-format data (response voice data) and text-format data (voice response timing metadata) is generated. Moreover, the details of the first response message and the second response message will be described with reference to FIGS. 5 to 7.

The communication unit 401 transmits the second response message supplied from the message generation unit 404 to the voice-user interface device 30 via the Internet 60.

Moreover, the communication unit 401 and the communication unit 402 are configured as a communication module, which is compatible with wireless communication or wired communication. In addition, in FIG. 4, the communication unit 401 and the communication unit 402 are described as separate communication modules for the convenience of description, but they can be integrated as one communication module.

In FIG. 4, the processing server 50 includes a communication unit 501, a processing unit 502, and a recording unit 503.

The communication unit 501 receives the request message transmitted from the voice assistance server 40 via the network 70 and supplies it to the processing unit 502. In addition, the communication unit 501 receives the current media time transmitted from the reception apparatus 20 by communication using WebSocket or the like and supplies it to the processing unit 502. Moreover, the communication unit 501 is configured as a communication module, which is compatible with wireless communication or wired communication.

The processing unit 502 extracts the voice response data recorded in the recording unit 503 on the basis of the request message supplied from the communication unit 501 and supplies the result to the communication unit 501. This voice response data is data of the voice response to the utterance of the viewer 2.

Further, the processing unit 502 extracts the voice response time information indicating the time suitable for the voice response from the voice response timing metadata (metadata of the entire program) recorded in the recording unit 503 on the basis of the current media time supplied from the communication unit 501. Then, the processing unit 502 supplies it to the communication unit 501 as the voice response timing metadata.

The recording unit 503 is a recording medium such as a semiconductor memory, an HDD, or an optical disc, and various data such as voice response data and the voice response timing metadata can be recorded therein. Moreover, the voice response data and the voice response timing metadata are not limited to that recorded in the recording unit 503, and, for example, can be generated by the processing unit 502 on the basis of various types of data such as data acquired from an external server or recorded in the recording unit 503 or data acquired from an external server.

The communication unit 501 transmits the voice response data and the voice response timing metadata supplied from the processing unit 502 to the voice assistance server 40 via the network 70 as the first response message.

Moreover, the content-voice AI cooperation system 1 executes a program called skill, which makes it possible to use the voice AI assistance service in cooperation with contents such as broadcast programs. For example, in the voice assistance server 40, a target skill is specified among a plurality of skills and is in cooperation with the processing unit 502 of the processing server 50 by the endpoint URL of the specified target skill. Thus, the processing for making a voice response to the viewer's utterance is performed. In other words, it can be said that the processing unit 502 constitutes a part of the target skill.

In this description, the skill includes information such as what kind of voice to respond to, what function to use with what word as a parameter, or what processing server (processing program) actually executes the function. In addition, the skill is a program (a computer program) used to perform processing corresponding to the voice transmitted from the voice-user interface device 30 on the basis of the above-mentioned information.

Figure 5:
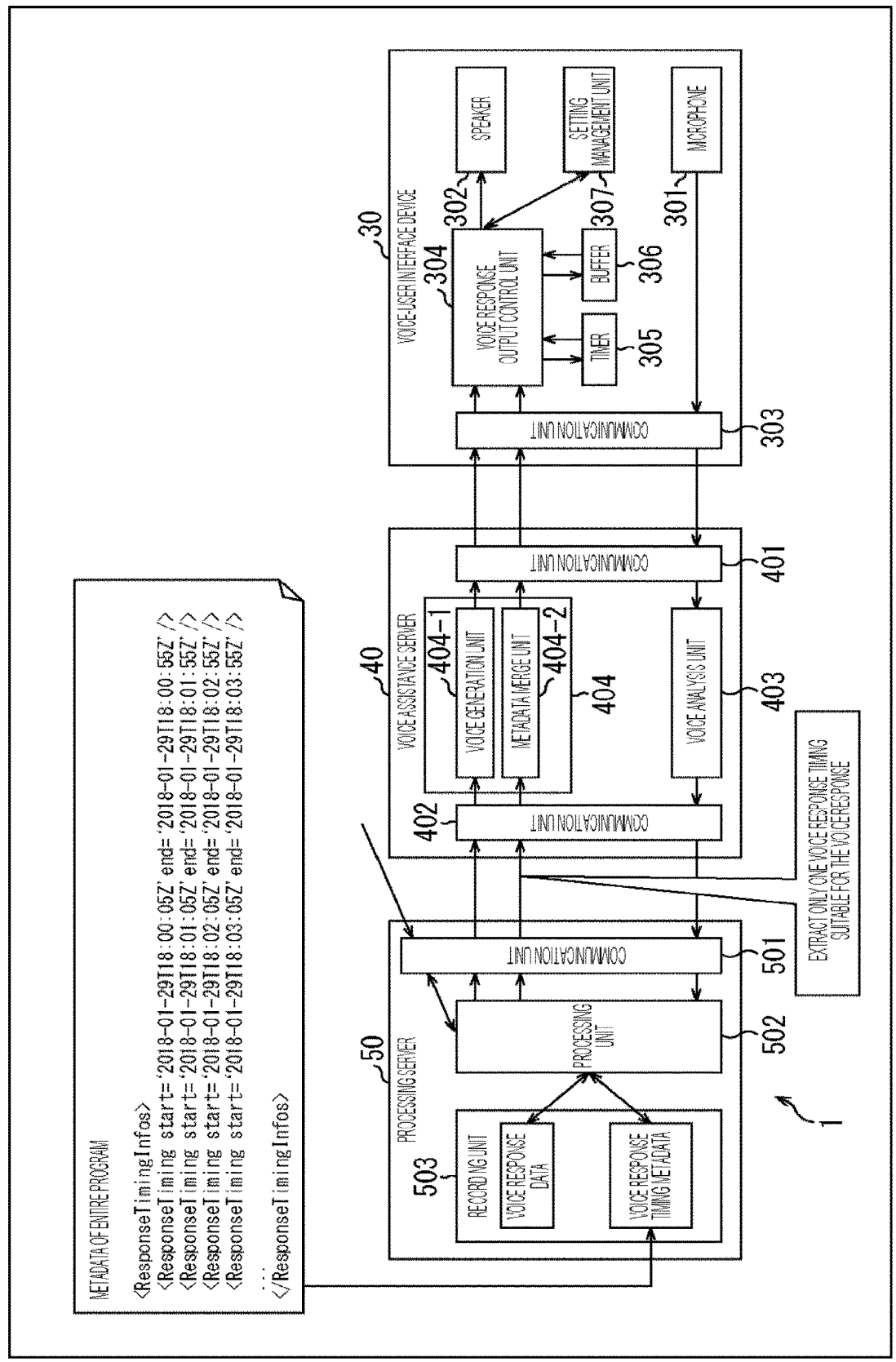
FIG. 5 is a diagram illustrating an example of communication between a voice assistance server and a processing server.
Figure 6:
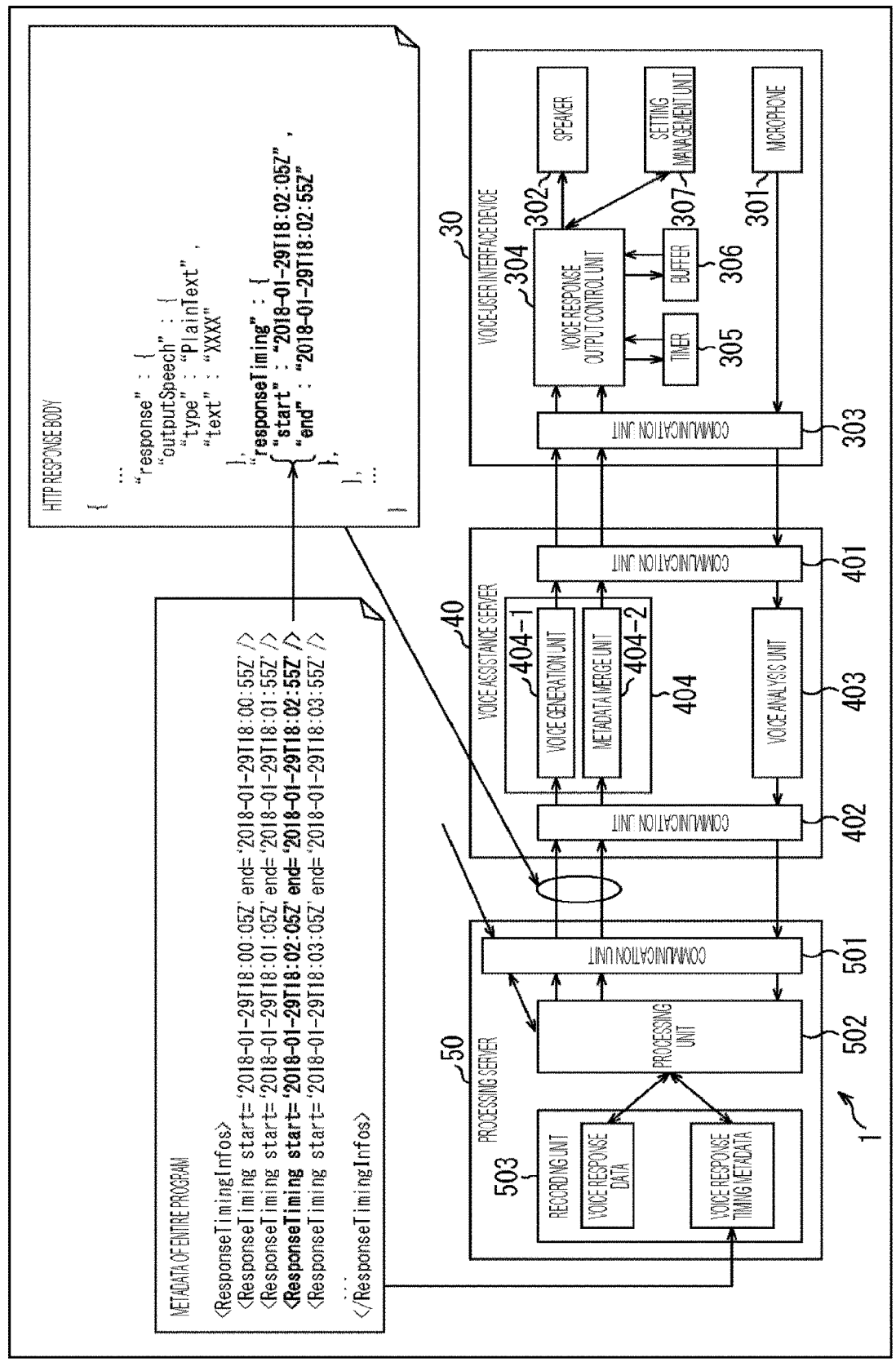
FIG. 6 is a diagram illustrating an example of communication between a voice assistance server and a processing server.
Figure 7:
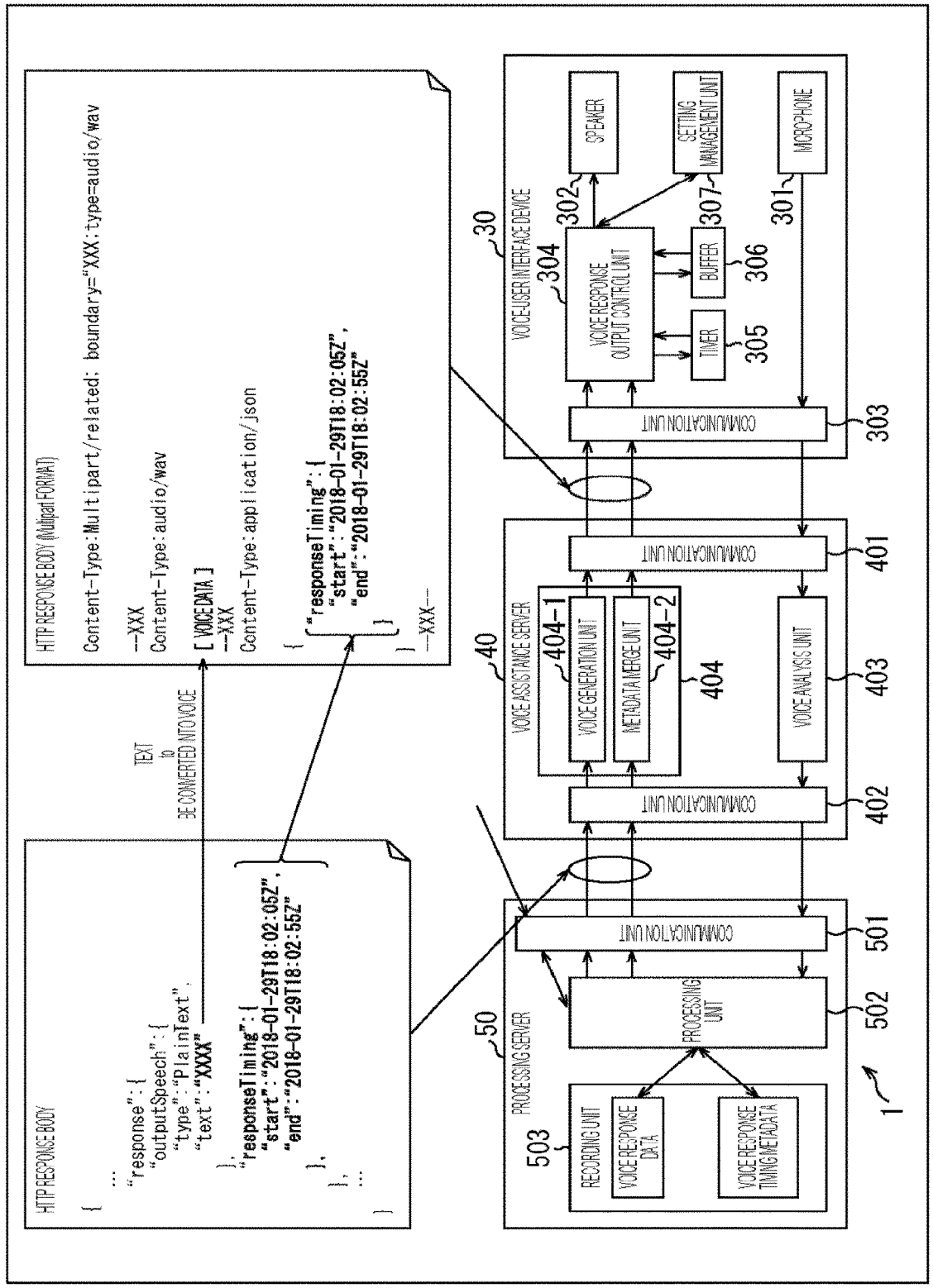
FIG. 7 is a diagram illustrating an example of communication between a voice-user interface device and a voice assistance server.

The content-voice AI cooperation system 1 is configured as described above, and the description of voice response data and voice response timing metadata exchanged between the voice assistance server 40 and the processing server 50 via communication is now given in detail with reference to FIGS. 5 to 7.

As shown in FIG. 5, in the processing server 50, the recording unit 503 has the voice response timing metadata delivered via communication recorded therein.

This voice response timing metadata is provided as metadata of the entire program for each broadcast program delivered via broadcasting. The example of FIG. 5 illustrates four voice-response timings as follows.

First voice response timing: 2018-01-29 18:00:05 to 2018-01-29 18:00:55

Second voice response timing: 2018-01-29 18:01:05 to 2018-01-29 18:01:55

Third voice response timing: 2018-01-29 18:02:05 to 2018-01-29 18:02:55

Fourth voice response timing: 2018-01-29 18:03:05 to 2018-01-29 18:03:55

The processing unit 502 acquires the current media time through communication using WebSocket or the like between the reception apparatus 20 and the processing server 50, so it is possible to extract only one voice response timing suitable for the voice response from the metadata of the entire program on the basis of this media time. Then, the processing unit 502 transmits one extracted voice response timing (voice response time information) to the voice assistance server 40 as the voice response timing metadata through a message in a predetermined format of an HTTP response or the like.

In this description, as shown in FIG. 6, there is a case where the HTTP response is used as the first response message when the third voice response timing is extracted from the metadata of the entire program as the time suitable for the voice response. In this case, the text data of the extracted third voice response timing is described in the body of the HTTP response. In addition, it is possible to describe the text data of the voice response data in the body of the HTTP response.

It is possible to describe the above-mentioned text data as data of the format of, for example, JavaScript (registered trademark) object notation (JSON). The JSON format object is expressed by key-value pairs with a colon (:), and these pairs are separated by a comma (,), zero or more of pairs are listed, and the whole is enclosed in curly braces ({ })

In the example of FIG. 6, the format of "PlainText" is described as the value of "type" to the object of the voice response data ("outputSpeech"), and the text data of "XXXX" is described as the value of "text". In addition, to the object of voice response timing ("responseTiming"), the start time of "2018-01-29T18:02:05Z" is described as the value of "start" and the end time of "2018-01-29T18:02:55Z" is described as the value of "end".

Further, the voice assistance server 40 receives and processes this HTTP response. For example, in a case where the HTTP response is used as the second response message, the processing as shown in FIG. 7 is performed.

In other words, the voice assistance server 40 converts the text data of the voice response data described in the body of the HTTP response received from the processing server 50 into the voice data for the response, and generates a multipart HTTP response by merging it with the text data (voice response time information) of the voice response timing.

In this way, in the voice assistance server 40, the first response message (HTTP response) received from the processing server 50 is processed, and the text format data (the voice response data and the voice response timing metadata (the voice response time information)) is converted into data of voice format (voice data of the response) and data of text format (the voice response timing metadata (the voice response time information)). Then, the voice assistance server 40 transmits the converted results to the voice-user interface device 30 as the second response message (HTTP response in a multipart format).

Moreover, although the metadata of the entire program is provided as the voice response timing metadata delivered via communication, the voice response timing can be prepared for all the time zones of a certain program or for some time zones. In addition, in the embodiment of the present technology, the voice response timing metadata can represent metadata of the entire program or can represent voice response time information extracted from the metadata, and so in a case where it is necessary to make a distinction, explicitly indicates that.

(Procedure of First Example of Processing in Each Device)

The procedure of the first example of the processing in each device of the first embodiment is now described with reference to the flowchart of FIG. 8.

In this description, the processing of step S101 is executed as a pre-setting. In other words, in the voice-user interface device 30, the setting management unit 307 sets to turn on the automatic timing control of the output of the response voice in accordance with an instruction from the viewer 2.

After this pre-setting, the broadcast delivery system 10 transmits a broadcast stream (S131). In this event, in the broadcast delivery system 10, the broadcast-accompanying application generation unit 102 generates a broadcast-accompanying application, and the multiplexer 103 inserts the generated broadcast-accompanying application into a stream including content such as broadcast programs.

The reception apparatus 20 receives the broadcast stream, the content such as broadcast programs is played, and the processing of step S132 is executed. In step S132, the broadcast-accompanying application execution unit 204 executes the broadcast-accompanying application on the basis of the application data obtained from the stream separated by the demultiplexer 202. This allows the reception apparatus 20 to playback the broadcast program selected by the viewer 2 and to execute the broadcast-accompanying application linked to the program.

Then, in a case where the viewer 2 who is watching the broadcast program makes a question utterance, the processing operations of step S102 and subsequent steps are executed.

Specifically, in the voice-user interface device 30, the microphone 301 picks up the utterance of the viewer 2, and the voice data of the utterance is transmitted to the voice assistance server 40. Then, in the voice assistance server 40, the voice data of the utterance from the voice-user interface device 30 is analyzed, and a request message corresponding to the analysis result is transmitted to the processing server 50.

The processing server 50 receives this request message via the network 70, and the processing operations of steps S103 and S104 are executed.

In step S103, the processing unit 502 acquires the current media time on the basis of the request message from the voice assistance server 40. In this stage, the processing server 50 (the communication unit 501 thereof) and the reception apparatus 20 (the communication unit 209 thereof) communicate with each other in accordance with a communication scheme of WebSocket or the like, for example. Thus, it is possible for the processing unit 502 to acquire the current media time from the broadcast-accompanying application execution unit 204 that is executing the broadcast-accompanying application.

In step S104, the processing unit 502 extracts the voice response time information indicating the time suitable for the voice response from the metadata of the entire program recorded in the recording unit 503 on the basis of the acquired current media time. Then, the processing unit 502 transmits the extracted voice response time information together with the voice response data corresponding to the request message to the voice assistance server 40 as the first response message.

In this description, the time suitable for the voice response can be considered to include, for example, the temporal length of the response voice (length of response) in addition to the time that does not involve an interference with the viewing such as a break in conversation from the development of the program being viewed. In other words, even when it does not interfere with the viewing, in a case where the output of the response voice is unable to be completed within that time, another long time can be extracted as the time suitable for the voice response. In addition, for example, on the playback time axis of the content being played in the reception apparatus 20, there is a case where the last time zone can be extracted as the time suitable for the voice response. Even in this case, when it takes time for the response voice to be output after the viewer's utterance, the earlier time zone can be extracted as the time suitable for the voice response.

In the voice assistance server 40, the voice data for the response is generated from the voice response data on the basis of the first response message from the processing server 50, and the voice response time information is merged with it to generate the second response message. The voice-user interface device 30 receives the second response message via the Internet 60, and the processing operations of steps S105 to S108 are executed.

In step S105, the voice response output control unit 304 checks (determines) whether or not voice response time information is added to the voice data for the response on the basis of the second response message from the voice assistance server 40. In a case where it is determined in step S105 that the voice response time information is added ("YES" in S105), the processing proceeds to step S106.

In step S106, the voice response output control unit 304 checks (determines) whether or not the automatic timing control is set to turn on by inquiring to the setting management unit 307. In a case where it is determined in step S106 that the automatic timing control is set to turn on by, for example, the pre-setting processing (S101) ("YES" in S106), the processing proceeds to step S107.

In step S107, the voice response output control unit 304 waits until the timing suitable for the voice response is reached on the basis of the added voice response time information. Then, when the timing suitable for the voice response is reached, the voice response output control unit 304 causes the response voice to be output by supplying the voice data for the response to the speaker 302 (S108).

In this way, it is possible for the voice-user interface device 30 to perform a voice response at the time suitable for a voice response, that is, at the time that does not involve an interference with the viewing, such as a break in conversation from the development of the program being viewed. This is performed on the basis of the voice response timing metadata (the voice response time information) acquired via communication. This makes it possible for the viewer 2 to listen to the response voice (information to want to know) without interfering with the viewing of the program.

Moreover, in the voice-user interface device 30, in a case where it is determined that the voice response time information is not added ("NO" in S105) or in a case where it is determined that the automatic timing control is set to off ("NO" in S106), the processing of step 3107 is skipped and the processing of step 3108 is executed. In other words, in this case, the response voice is output immediately without waiting for the voice response timing.

The above description is given of the procedure of the processing in a case of controlling the timing of the voice response to the utterance of the viewer 2 on the basis of the voice response timing metadata (the voice response time information) acquired via communication as the procedure of the first example of the processing in each device of the first embodiment.

(Second Example of Configuration)

Figure 9:
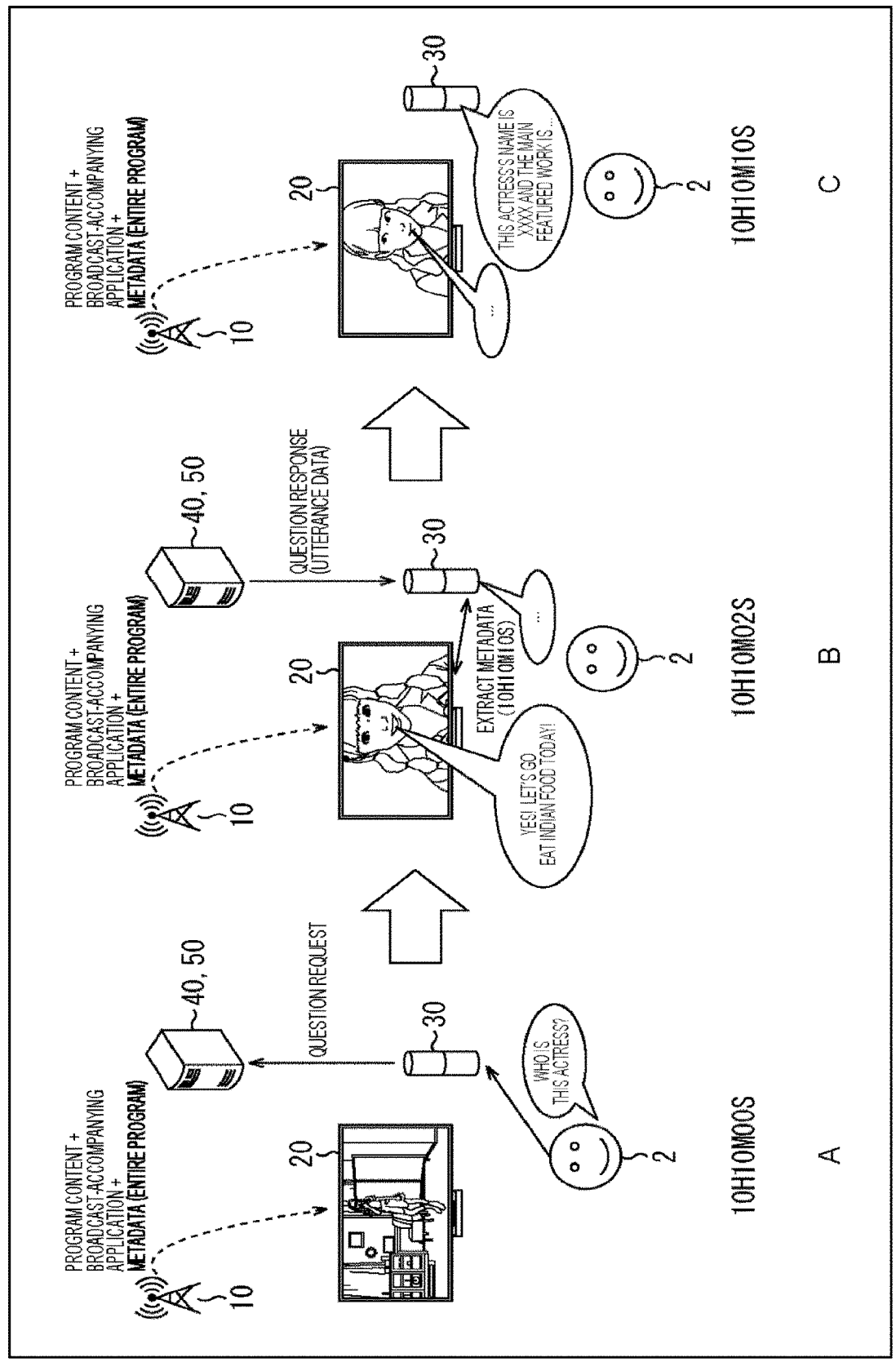
FIG. 9 is a diagram illustrating a second example of the configuration of the first embodiment.

FIG. 9 is a diagram illustrating a second example of a configuration of the first embodiment.

FIG. 9 illustrates the processing procedure according to the progress of the broadcast program being viewed by the viewer 2 in a time-series manner with reference to the portions A to C of FIG. 9, which is similar to FIG. 3. On the other hand, the processing shown in FIG. 9 differs from the processing shown in FIG. 3 in that the voice data for the response and the voice response timing metadata are sent via broadcasting not via communication.

The reception apparatus 20 acquires and records voice response timing metadata (metadata of the entire program) transmitted from the broadcast delivery system 10, together with the content such as broadcast programs and the broadcast-accompanying application. The reception apparatus 20, in response to the inquiry from the user interface device 30, is capable of extracting the voice response time information indicating the time suitable for the voice response from the metadata of the entire recorded program and making a notification of it as the voice response timing metadata.

At 10:10:00 (10 h:10 m:00 s), when the viewer 2 makes an utterance "Who is this actress?" while watching a drama program, the user interface device 30 picks up the utterance of the viewer 2 with the microphone, and transmits the voice data of the utterance to the voice assistance server 40 (portion A in FIG. 9).

At 10:10:02 (10 h:10 m:02 s), the user interface device 30 receives the voice data for the response from the voice assistance server 40, but on the basis of the voice response timing metadata acquired from the reception apparatus 20, the time (time of day) indicated by the voice response time information is 10:10:10, so it waits until that time (time of day) (portion B in FIG. 9). In other words, in the drama program being viewed, a conversation scene occurs at about 10:10:02, and so the timing of the voice response is shifted to prevent it from overlapping with the actress's utterance or the like.

Then, when the time reaches 10:10:10, the time being the time (time of day) which is indicated by the voice response time information, the user interface device 30 outputs the response voice "The name of this actress is XXXX and the main featured work is . . . " on the basis of the voice data for the response held in a buffer during waiting (portion C in FIG. 9).

In this way, it is possible for the user interface device 30 to perform a voice response at the timing suitable for a voice response, that is, at the time that does not involve an interference with the viewing, such as a break in conversation from the development of the program being viewed. This is performed on the basis of the voice response timing metadata (the voice response time information) obtained via broadcasting. This makes it possible for the viewer 2 to listen to the response voice (information to want to know) without interfering with the viewing of the program.

Moreover, the description is given of the case of using the actual time as an example also in FIG. 9, similar to FIG. 3. However, practically, it is possible to control the timing of the voice response using the media time of the content being played in the reception apparatus 20.

(Second Example of Detailed Configuration of Each Device)

Figure 10:
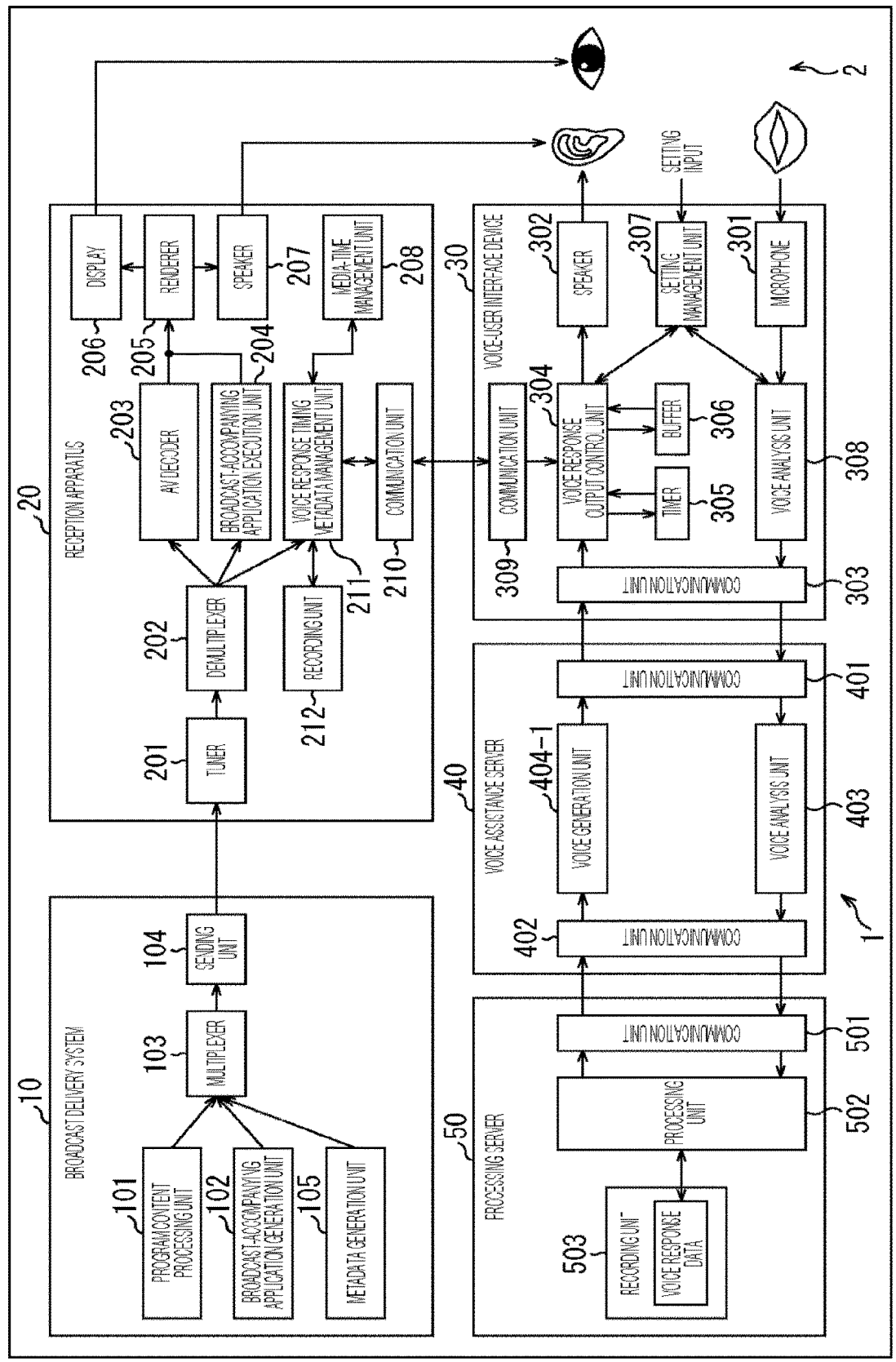
FIG. 10 is a block diagram illustrating a second example of a detailed configuration of each device according to the first embodiment.

FIG. 10 is a block diagram illustrating a second example of a detailed configuration of each device according to the first embodiment.

FIG. 10 shows, similarly to FIG. 4, an example of the configurations of the broadcast delivery system 10 provided on the broadcast station side (transmitting side) and the reception apparatus 20 provided on the local side (receiving side), in addition, FIG. 10 shows an example of the configuration of the voice-user interface device 30 provided on the local side and the configurations of the voice assistance server 40 and the processing server 50 provided on the cloud side.

In FIG. 10, the broadcast delivery system 10 includes a program content processing unit 101, a broadcast-accompanying application generation unit 102, a multiplexer 103, a sending unit 104, and a metadata generation unit 105. In other words, in the broadcast delivery system 10 shown in FIG. 10, the metadata generation unit 105 is added as compared with the configuration shown in FIG. 4.

The metadata generation unit 105 generates the voice response timing metadata and supplies it to the multiplexer 103. The voice response timing metadata is metadata of the entire program for each program delivered via broadcasting, and includes a metadata candidate extracted as the voice response time information including the time suitable for the voice response.

The multiplexer 103 multiplexes the voice response timing metadata supplied from the metadata generation unit 105 together with the content and the broadcast-accompanying application, and supplies the resultant stream to the sending unit 104.

In FIG. 10, the reception apparatus 20 includes a tuner 201, a demultiplexer 202, an AV decoder 203, a broadcast-accompanying application execution unit 204, a renderer 205, a display 206, a speaker 207, a media-time management unit 208, a communication unit 210, a voice response timing metadata management unit 211, and a recording unit 212. In other words, the reception apparatus 20 shown in FIG. 10 has the communication unit 210, the voice response timing metadata management unit 211, and the recording unit 212 as additional components in place of the communication unit 209 as compared to the configuration shown in FIG. 4.

The communication unit 210 is configured, for example, as a communication module, which is compatible with wireless communication such as Bluetooth (registered trademark), wireless LAN, and cellular communication or wired communication. The communication unit 210 communicates with the voice-user interface device 30 (specifically, a communication unit 309 thereof) in accordance with a predetermined communication scheme to exchange various data.

The voice response timing metadata management unit 211 acquires the voice response timing metadata (metadata of the entire program) obtained from the stream separated by the demultiplexer 202 and records it in the recording unit 212.

Further, the voice response timing metadata management unit 211, in a case of receiving a voice response timing metadata acquisition request from the voice-user interface device 30 (the voice response output control unit 304 thereof), makes an inquiry to the media-time management unit 208 to acquire the current media time. The voice response timing metadata management unit 211 extracts the voice response time information indicating the time suitable for the voice response from the voice response timing metadata (metadata of the entire program) recorded in the recording unit 212 on the basis of the acquired current media time. Then, the voice response timing metadata management unit 211 transmits it to the voice-user interface device 30 as the voice response timing metadata.

The recording unit 212 is a recording medium such as semiconductor memory, HDDs, or optical disks, and various data including the voice response timing metadata can be recorded therein.

In FIG. 10, the voice-user interface device 30 includes a microphone 301, a speaker 302, a communication unit 303, a voice response output control unit 304, a timer 305, a buffer 306, a setting management unit 307, a voice analysis unit 308, and a communication unit 309. In other words, in the voice-user interface device 30 shown in FIG. 10, the voice analysis unit 308 and the communication unit 309 are added as compared with the configuration shown in FIG. 4.

The voice analysis unit 308 processes the voice data of the utterance supplied from the microphone 301 and supplies it to the communication unit 303. In addition, the voice analysis unit 308 analyzes the voice data of the utterance and, in cooperation with the setting management unit 307, performs the timing control target utterance settings based on the analysis result of the voice data of the utterance.

The communication unit 309 is configured, for example, as a communication module that supports wireless communication such as Bluetooth (registered trademark) or wired communication. The communication unit 309 communicates with the reception apparatus 20 (the communication unit 210 thereof) in accordance with a predetermined communication scheme to exchange various data. Moreover, in FIG. 10, the communication unit 303 and the communication unit 309 are described as separate communication modules for the convenience of description, but they can be integrated as one communication module.

The voice response output control unit 304 is supplied with the voice data for the response from the communication unit 303 and is supplied with the voice response timing metadata from the communication unit 309. The voice response output control unit 304 supplies the voice data for the response to the speaker 302 at the timing corresponding to the time indicated by the voice response time information (timing suitable for the voice response) on the basis of the voice response timing metadata acquired via broadcasting.

In FIG. 10, the voice assistance server 40 includes a communication unit 401, a communication unit 402, a voice analysis unit 403, and a voice generation unit 404-1. In other words, in the voice assistance server 40 shown in FIG. 10, the voice response timing metadata is not delivered via communication and so it is not necessary to perform the processing related thereto. Thus, the metadata merge unit 405-2 of the message generation unit 404 shown in FIG. 4 is omitted, which is different from the configuration of FIG. 4.

Further, in FIG. 10, the processing server 50 includes a communication unit 501, a processing unit 502, and a recording unit 503. In other words, the processing server 50 shown in FIG. 10 has a configuration similar to that shown in FIG. 4, but the voice response timing metadata is not delivered via communication, and so in the recording unit 503, the voice response timing metadata is not recorded, but only the voice response data is recorded.

The content-voice AI cooperation system 1 is configured as described above. The description is given of the voice response timing metadata exchanged between the broadcast delivery system 10 and the reception apparatus 20 via broadcasting in detail with reference to FIGS. 11 to 12.

Figure 11:
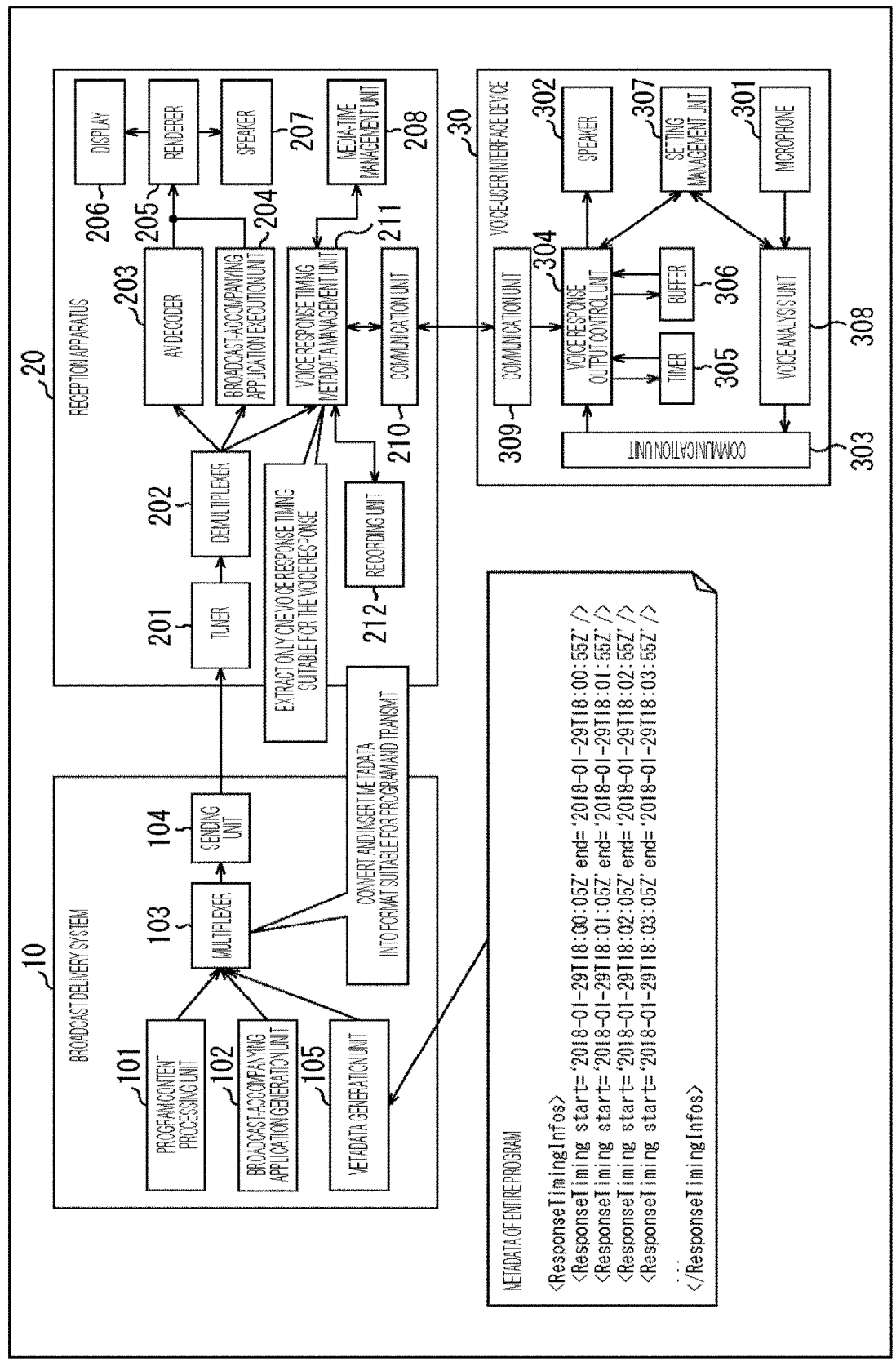
FIG. 11 is a diagram illustrating an example of metadata exchanged between a broadcast delivery system and a reception apparatus.

As shown in FIG. 11, in the broadcast delivery system 10, the metadata generation unit 105 generates the voice response timing metadata to be delivered via broadcasting. This voice response timing metadata is generated as metadata of the entire program for each program (excluding live broadcast) delivered via broadcasting.

First voice response timing: 2018-01-29 18:00:05 to 2018-01-29 18:00:55

Second voice response timing: 2018-01-29 18:01:05 to 2018-01-29 18:01:55

Third voice response timing: 2018-01-29 18:02:05 to 2018-01-29 18:02:55

Fourth voice response timing: 2018-01-29 18:03:05 to 2018-01-29 18:03:55

The multiplexer 103 converts the voice response timing metadata into a format suitable for the content and inserts it into the stream in which the content and the broadcast-accompanying application are multiplexed.

In this description, for example, in a case where the content is delivered as a stream compliant to MPEG-dynamic adaptive streaming over HTTP (DASH), it is possible to transfer the voice response timing metadata using a media presentation description (MPD), which is the control information of the video or audio file.

Figure 12:
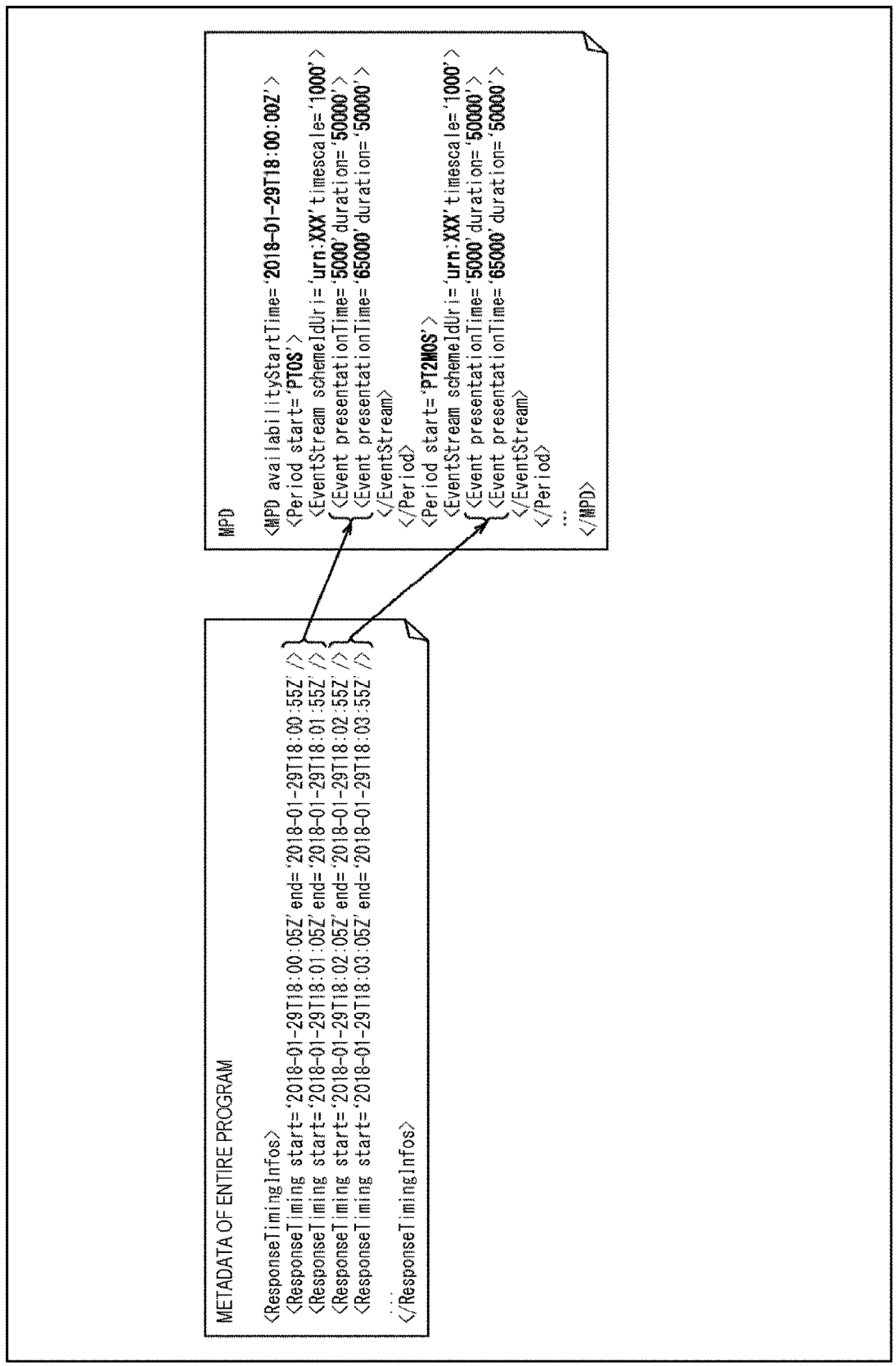
FIG. 12 is a diagram illustrating an example of a description of an MPD.

FIG. 12 shows an example in which the voice response timing metadata is inserted into the MPD. In this example, the MPD includes elements of Period, AdaptationSet, and Representation in a hierarchical structure.

The element Period is an element to describe the configuration of content such as broadcast programs. In addition, the elements AdaptationSet and Representation, which are used for each stream of components such as video, audio, and subtitle that constitute the content, are capable of describing an attribute of each stream.

Further, it is possible to describe an element EventStream in the element Period. In addition, attributes schemeIdUri and timescale can be described in the element EventStream as its attribute.

In the attribute schemeIdUri, a uniform resource identifier (URI) used to identify the scheme is described. In the MPD description example of FIG. 12, "urn:XXX" is defined as the URI for identifying a scheme for transmitting the voice response timing metadata and is described as the attribute value of the attribute schemeIdUri. In addition, a timescale of "1000" is described in the attribute timescale as its attribute value.

The element EventStream is a superordinate element of an element Event. In the element Event, an attribute presentationTime in which a presentation time (start time) is specified and an attribute duration in which a period from the start time is specified can be described as its attribute.

In the MPD description example in FIG. 12, the metadata of the entire program is divided into every element Period corresponding thereto and is described as attribute values of the attributes presentationTime and duration in the element EventStream.

Specifically, the first and second voice response timings described in the metadata of the entire program are described in the first Period element (attribute start='PT0S') and the third and fourth voice response timings are described in the second Period element (attribute start='PT2M0S').

As described above, the transmission of the voice response timing metadata using the MPD makes it possible for the reception apparatus 20 to acquire the voice response timing metadata (metadata of the entire program) from the MPD inserted in the broadcast stream and to record it in the recording unit 212. Then, it is possible for the reception apparatus 20 to extract the voice response time information indicating the time suitable for the voice response from the voice response timing metadata (metadata of the entire program) recorded in the recording unit 212 in response to an inquiry from the voice-user interface device 30 and to makes a notification of it as the voice response timing metadata.

Moreover, although the metadata of the entire program is provided as the voice response timing metadata delivered via broadcasting, the voice response timing can be prepared for all the time zones of a certain program or for some time zones.

(Procedure of Second Example of Processing in Each Device)

The procedure of the second example of the processing in each device of the first embodiment is now described with reference to the flowchart of FIG. 13.

In this description, the processing of step S151 is executed as a pre-setting. In other words, in the voice-user interface device 30, the setting management unit 307 sets to turn on the automatic timing control in accordance with the instruction from the viewer 2. In addition, in this description, the invocation name of the timing control target or the destination for the acquisition of the voice response timing metadata (destination for metadata acquisition communication) is set.

Moreover, the invocation name is an invoking name used to invoke a skill. In other words, the end-user (a viewer who watches content) is necessary to utter an invocation name upon using the skill. In this description, for example, "TV show" can be set as the invocation name of the timing control target, and the reception apparatus 20 can be set as the destination for metadata acquisition communication.

After the pre-setting, the processing operations of steps S181 to S182 are executed in the broadcast delivery system 10.

In other words, the metadata generation unit 105 generates the voice response timing metadata (metadata of the entire program), and the multiplexer 103 inserts the generated voice response timing metadata into a stream including content such as broadcast programs (S181). In addition, the sending unit 104 transmits the broadcast stream in which the voice response timing metadata is inserted (S182).

The broadcast stream is received by the reception apparatus 20, the content such as broadcast programs is played, and the processing of step S183 is executed. In step S183, the voice response timing metadata management unit 211 acquires the voice response timing metadata obtained from the stream separated by the demultiplexer 202. The voice response timing metadata (metadata of the entire program) is recorded in the recording unit 212.

Then, in a case where the viewer 2 who is watching the broadcast program makes a question utterance, the processing operations of step S152 and subsequent steps are executed.

Specifically, in the voice-user interface device 30, the microphone 301 picks up the utterance of the viewer 2, and the voice data of the utterance is transmitted to the voice assistance server 40 (S152). Then, in the voice assistance server 40, the voice data of the utterance from the voice-user interface device 30 is analyzed, and a request message corresponding to the analysis result is transmitted to the processing server 50.

In this event, in the voice-user interface device 30, the voice analysis unit 308 cooperates with the setting management unit 307 to extract a target invocation name that is set by the pre-setting processing (S151) from the utterance of the viewer 2 on the basis of the analysis result of the voice data of the utterance and to set the utterance from which the invocation name is extracted as the timing control target utterance (S153).

Further, the processing server 50 receives the request message transmitted via the network 70 from the voice assistance server 40, and the processing of step S154 is executed.

In step S154, the processing unit 502 extracts the voice response data recorded in the recording unit 503 on the basis of the request message from the voice assistance server 40 and transmits it to the voice assistance server 40. In the voice assistance server 40, the voice generation unit 404-1 generates voice data for the response corresponding to the voice response data and transmits it to the voice-user interface device 30.

The voice-user interface device 30 receives this voice data for the response via the Internet 60, and the processing operations of step S155 and subsequent steps are executed.

In step S155, the voice response output control unit 304 checks (determines) whether or not the received voice data for the response is a response to the timing control target utterance by inquiring of the setting management unit 307. In a case where it is determined in step S155 that the received response is the response to the timing control target utterance set in the processing of step S153 ("YES" in S155), the processing proceeds to step S156.

In step S156, the voice response output control unit 304 checks (determines) whether or not the automatic timing control is set to turn on by inquiring to the setting management unit 307. In a case where it is determined in step S156 that the automatic timing control is set to turn on by the pre-setting processing (S151) ("YES" in S156), the processing proceeds to step S157.

In step S157, the voice response output control unit 304 acquires the voice response time information by receiving the voice response timing metadata from the reception apparatus 20 that is set as the destination for metadata acquisition communication in the pre-setting processing (S151).

In other words, in this description, the voice response output control unit 304 issues a voice response timing metadata acquisition request to the reception apparatus 20, and so the reception apparatus 20 executes the processing operations of steps S158 to S159.

In step S158, the voice response timing metadata management unit 211 acquires the current media time by making an inquiry to the media-time management unit 208 on the basis of the acquisition request from the voice-user interface device 30.

In step S159, the voice response timing metadata management unit 211 extracts the voice response time information indicating the time suitable for voice response from the voice response timing metadata (metadata of the entire program) recorded in the recording unit 212 on the basis of the acquired current media time. Then, the voice response timing metadata management unit 211 transmits the extracted information to the voice-user interface device 30 as the voice response timing metadata. In this description, the time suitable for the voice response can be considered to include, for example, the temporal length of the response voice (length of response), the time zone on the playback time axis of the content being played, or the like, in addition to the time that does not involve an interference with the viewing such as a break in conversation from the development of the program being viewed.

The voice-user interface device 30 receives the voice response timing metadata (voice response time information), and the processing operations of steps S160 to S161 are executed.

In step S160, the voice response output control unit 304 waits until the timing suitable for the voice response is reached on the basis of the acquired voice response time information. Then, when the timing suitable for the voice response is reached, the voice response output control unit 304 causes the response voice to be output by supplying the voice data for the response to the speaker 302 (S161).

In this way, it is possible for the voice-user interface device 30 to perform a voice response at the time suitable for a voice response, that is, at the time that does not involve an interference with the viewing, such as a break in conversation from the development of the program being viewed. This is performed on the basis of the voice response timing metadata (the voice response time information) acquired via broadcasting. This makes it possible for the viewer 2 to listen to the response voice (information to want to know) without interfering with the viewing of the program.

Moreover, in the voice-user interface device 30, in a case where it is determined that the received response is not the response to the timing control target utterance ("NO" in S155) or in a case where it is determined that the automatic timing control is set to off ("NO" in S156), the processing of steps S157 to S160 are skipped and the processing of step S161 is executed. In other words, in this case, the response voice is output immediately without waiting for the voice response timing.

The above description is given of the procedure of the processing in a case of controlling the timing of the voice response to the utterance of the viewer 2 on the basis of the voice response timing metadata (the voice response time information) acquired via broadcasting as the procedure of the second example of the processing in each device of the first embodiment.

As described above, in the first embodiment, there is the case where the voice response output control unit 304 of the voice-user interface device 30 uses the voice AI assistance service in cooperation with the content such as broadcast programs. In this case, the timing of the voice response is controlled on the basis of the voice response time information indicating the time suitable for the voice response to the utterance of the viewer who watches the content. This voice response time information can be information indicating the time suitable for the voice response on the playback time axis of content such as broadcast programs.

In this description, in the case where the voice response time information (voice response timing metadata) is acquired via communication, the content such as broadcast programs is being played in the reception apparatus 20 (the first device), and the voice response time information is delivered by the processing server 50 (the second device) via communication. In the processing server 50 (the second device), the voice response time information indicating the time suitable for the voice response to the content being played in the reception apparatus 20 (the first device) is extracted and delivered from the voice response timing metadata (metadata of the entire program). This voice response timing metadata includes the voice response time information for the entirety or a part of the time on the playback time axis of the content. Then, in the voice-user interface device 30, the voice response output control unit 304 controls the timing of voice response on the basis of the voice response time information delivered via communication.

Further, in the case where the voice response time information (voice response timing metadata) is acquired via broadcasting, the content such as broadcast programs is played in the reception apparatus 20 (the first device). The voice response time information is delivered via broadcasting by the broadcast server (the second device) of the broadcast delivery system 10. In the broadcast server (the second device), the voice response timing metadata (metadata of the entire program) including the voice response time information for the entirety or a part of the time on the playback time axis of the content is delivered. In the reception apparatus 20 (the first device), the voice response time information indicating the time suitable for a voice response to the content being played is extracted from the voice response timing metadata (metadata of the entire program) delivered via broadcasting. Then, in the voice-user interface device 30, the voice response output control unit 304 controls the timing of the voice response on the basis of the voice response time information extracted by the reception apparatus 20 (the first device).

It can be said that the voice-user interface device 30 having such function is an information processing apparatus including the voice response output control unit 304.

(2) Second Embodiment

By the way, although the above-mentioned first embodiment illustrates the configuration that controls the timing of voice response to the viewer's utterance on the basis of the voice response time information on the system side, it is considered that the timing of the voice response differs from the desired timing depending on the viewer 2.

Figure 14:
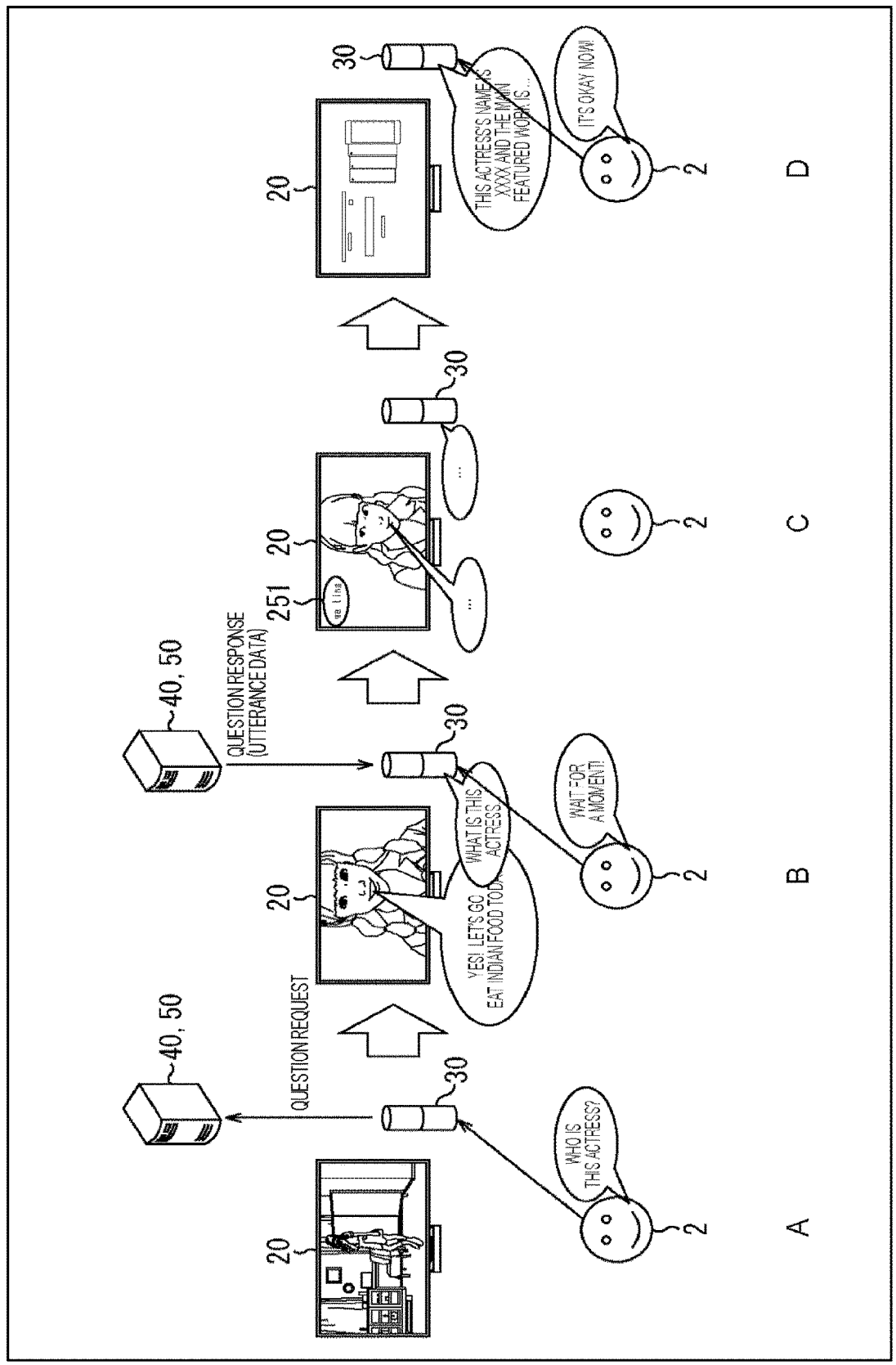
FIG. 14 is a diagram illustrating an example of a configuration of a second embodiment.
Figure 15:
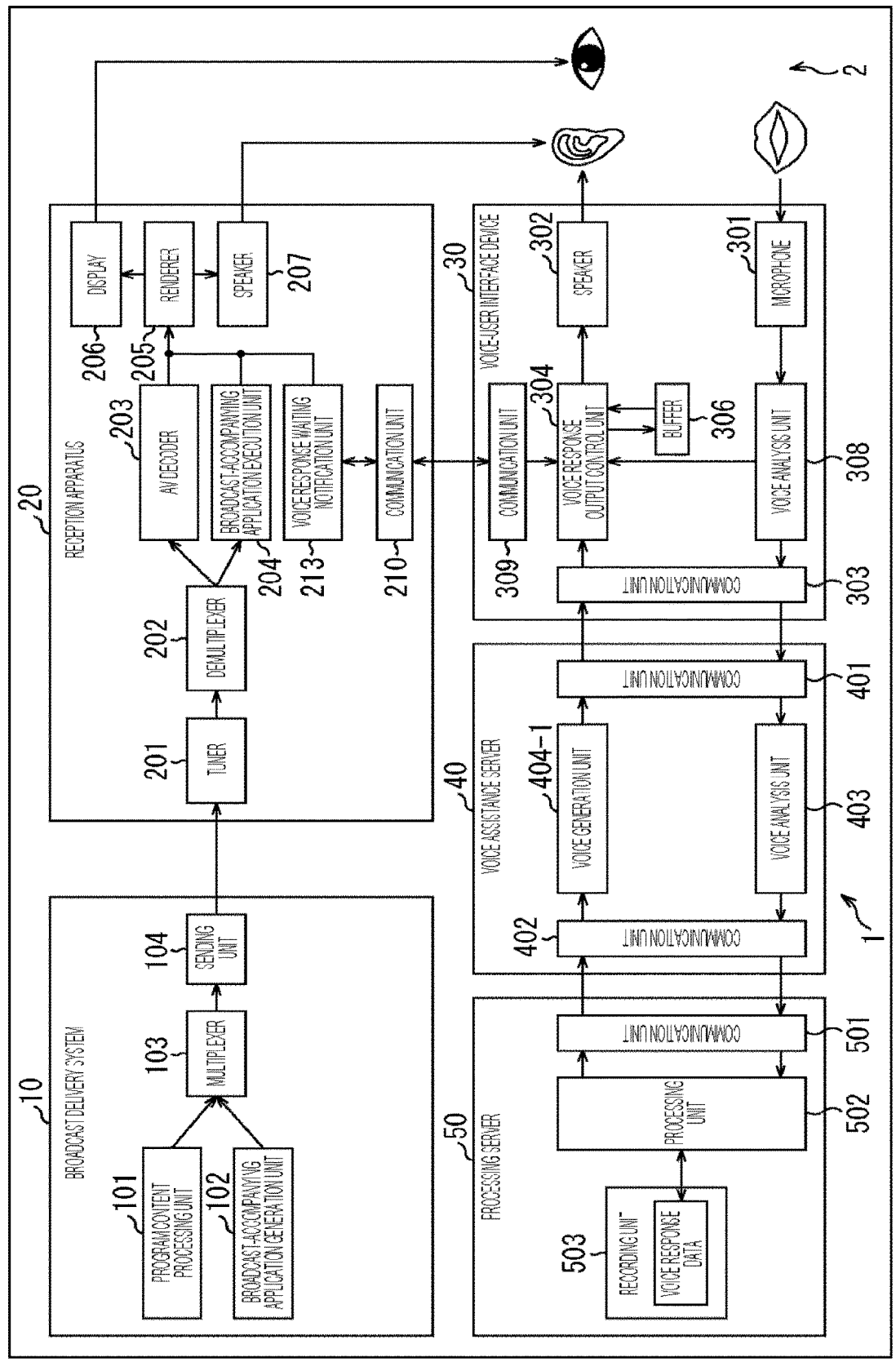
FIG. 15 is a block diagram illustrating an example of a detailed configuration of each device according to the second embodiment.
Figure 16:
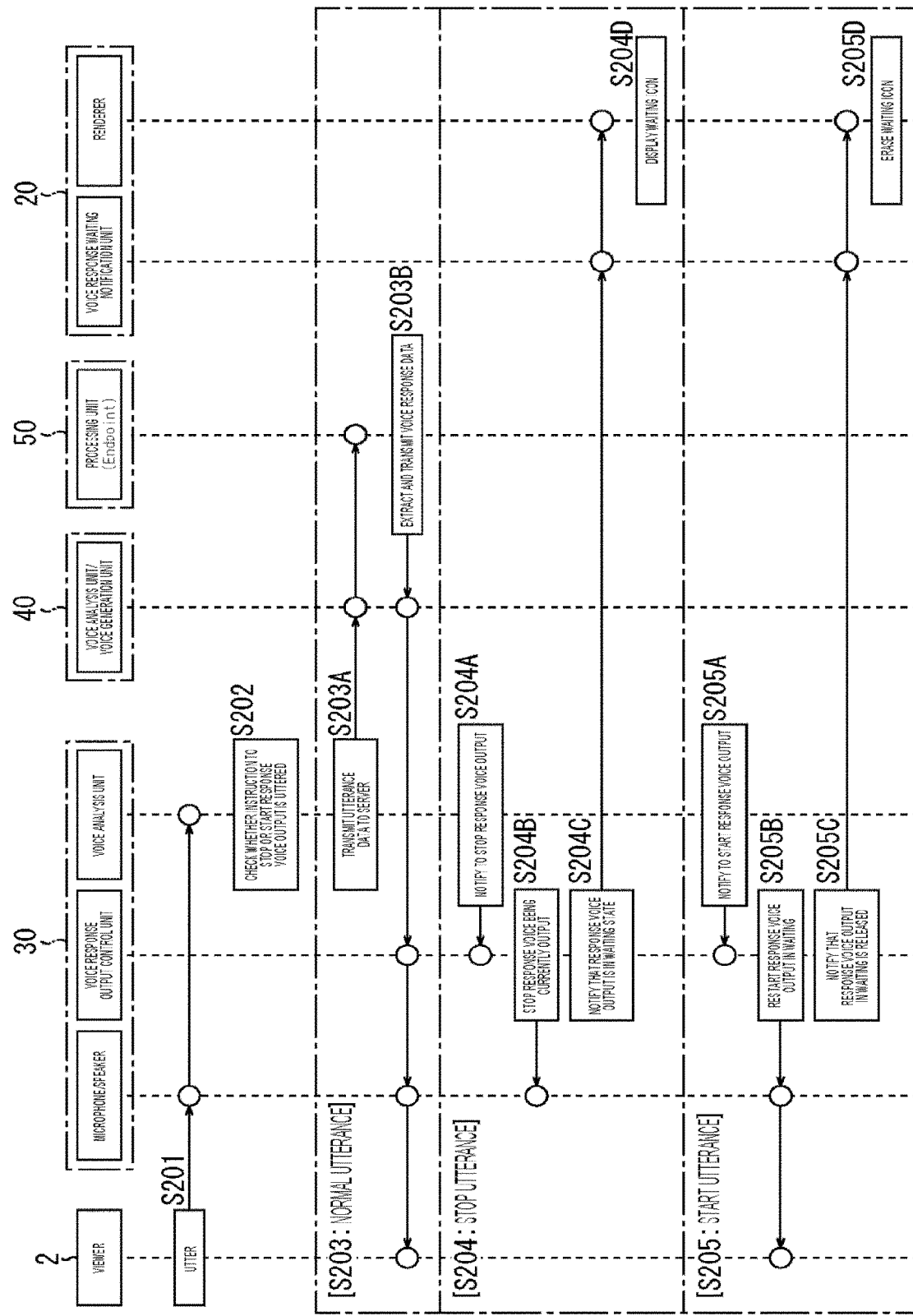
FIG. 16 is a flowchart illustrated to describe the processing procedure in each device according to the second embodiment.

Then, a configuration that controls the timing of the voice response on the basis of an instruction utterance from the viewer 2 is now described as a second embodiment with reference to FIGS. 14 to 16.

(Example of Configuration)

FIG. 14 is a diagram illustrating an example of the configuration of the second embodiment.

FIG. 14 shows the procedure of processing in accordance with the progress of the broadcast program viewed by the viewer 2 in time series using portions A to D in FIG. 14.

As illustrated in A in FIG. 14, when the viewer 2 makes an utterance "Who is this actress?" while watching a drama program, the user interface device 30 picks up the utterance of the viewer 2 with the microphone, and transmits the voice data of the utterance to the voice assistance server 40.

Then, as illustrated in the portion B of FIG. 14, the voice assistance server 40 performs the processing in cooperation with the processing server 50 provided by the broadcast station of the drama program being viewed, and so generates the voice data for the response to the utterance and transmits it to the user interface device 30.

Then, the user interface device 30 outputs the response voice corresponding to the voice data for the response from the voice assistance server 40, but the output of the response voice overlaps with the conversation scene of the drama program being viewed. In this event, in a case where the viewer 2 gives a stop instruction (waiting instruction) such as "wait for a moment!", the output of the response voice is stopped and an icon indicating that it is in a waiting state (hereinafter, referred to as a waiting icon) is presented to cause a response to wait.

In other words, as shown in the portion C of FIG. 14, the output of the response voice from the user interface device 30 is stopped, and a waiting icon 251 is displayed on the screen of the reception apparatus 20 to be superimposed on the video of the drama program.

Then, in a case where the viewer 2 gives a start instruction (waiting release instruction) such as "It's okay now!" when the drama program being viewed continues and, for example, the channel is turned to TV advertisement, the output of the response voice that has been stopped is started (restarted) and the waiting icon 251 is erased.

In other words, as shown in the portion D of FIG. 14, output of the response voice is started (restarted). The user interface device 30 outputs the response voice of "The name of this actress is XXXX and the main featured work is . . . ", on the basis of the voice data for the response from the voice assistance server 40.

In this event, in the reception apparatus 20, the TV advertisement is being played, and the voice response is output, for example, at the timing that does not interfere with the viewing by the viewer 2 who watches the drama program. In other words, in this example, the viewer 2 wants to concentrate on the drama program not only in the scene where there is a conversation but also in the scene where there is no conversation, and so the viewer is caused to wait for a response until the TV advertisement is played.

(Example of Detailed Configuration of Each Device)

FIG. 15 is a block diagram illustrating an example of a detailed configuration of each device of the second embodiment.

FIG. 15 shows, similarly to FIGS. 4 and 10, an example of the configurations of the broadcast delivery system 10 and the reception apparatus 20, in addition, FIG. 15 shows an example of the configuration of the voice-user interface device 30 provided on the local side and the configurations of the voice assistance server 40 and the processing server 50 provided on the cloud side.

Moreover, in FIG. 15, the configuration of the broadcast delivery system 10 is similar to the configuration shown in FIG. 4, and so the description thereof is omitted here. In addition, in FIG. 15, the configurations of the voice assistance server 40 and the processing server 50 are similar to the configurations shown in FIG. 10, and so the description thereof is omitted here.

In FIG. 15, the reception apparatus 20 includes a tuner 201, a demultiplexer 202, an AV decoder 203, a broadcast-accompanying application execution unit 204, a renderer 205, a display 206, a speaker 207, a communication unit 210, and a voice response waiting notification unit 213. In other words, the configuration of the reception apparatus 20 shown in FIG. 15 is provided with the voice response waiting notification unit 213 and the communication unit 210 instead of the media-time management unit 208 and the communication unit 209, as compared with the configuration shown in FIG. 4.

The voice response waiting notification unit 213, in a case of receiving the notification indicating the waiting state from the voice-user interface device 30 (the voice response output control unit 304 thereof), instructs the renderer 205 to display the waiting icon. In addition, the voice response waiting notification unit 213, in a case of receiving the notification indicating the release state from the voice-user interface device (the voice response output control unit 304 thereof), instructs the renderer 205 to delete the waiting icon.

In FIG. 15, the voice-user interface device 30 includes a microphone 301, a speaker 302, a communication unit 303, a voice response output control unit 304, a buffer 306, a voice analysis unit 308, and a communication unit 309. In other words, in the voice-user interface device 30 shown in FIG. 15, as a replacement for the timer 305 and the setting management unit 307 that are excluded, the voice analysis unit 308 and the communication unit 309 are added as compared with the configuration shown in FIG. 4.

The voice analysis unit 308 analyzes the voice data of the utterance supplied from the microphone 301 and checks (determines) whether the utterance of the stop instruction (waiting instruction) is performed or the start instruction (waiting release instruction) is performed for the output of the response voice on the basis of the result obtained by the analysis.

The voice analysis unit 308, in a case of determining that the utterance of the stop instruction or the start instruction for the output of the response voice is not performed, supplies the voice data of the utterance to the communication unit 303. This allows the voice data of the utterance to be transmitted to the voice assistance server 40 via the Internet 60. In addition, the voice analysis unit 308, in a case of determining that the utterance of the stop instruction or the start instruction for the output of the response voice is performed, notifies the voice response output control unit 304 of the determination result.

The voice response output control unit 304 controls, on the basis of the notification from the voice analysis unit 308, the output of the response voice currently being output to be stopped in a case of being instructed to stop the output of the response voice, and controls the output of the response voice in the waiting state (stopped) to be started (restarted) in a case of being instructed to start (restart) the output of the response voice. In addition, the voice response output control unit 304 controls so that a notification indicating that the waiting state or the released state is given to the reception apparatus 20 (the voice response waiting notification unit 213 thereof) on the basis of the notification from the voice analysis unit 308.

(Processing Procedure in Each Device)

The processing procedure in each device of the second embodiment is now described with reference to the flowchart of FIG. 16.

In a case where the viewer 2 who is watching the broadcast program being played in the reception apparatus 20 makes an utterance, in the voice-user interface device 30, the microphone 301 picks up the utterance (S201). In addition, the voice analysis unit 308 analyzes the voice data of the picked utterance and checks (determines) whether the stop instruction (waiting instruction) or the start instruction (waiting release instruction) is uttered for the output of the response voice on the basis of the analysis result (S202).

In this description, one of the three processing operations of normal utterance, stop utterance, and start utterance is executed depending on the result of the determination processing in step S202.

In the first case, in the determination processing of step S202, in a case where it is determined that a normal utterance, for example, such as an utterance of "who is this actress?", is made rather than the utterance of stop instruction or start instruction for the output of the response voice, the processing proceeds to step S203 and the normal utterance processing is executed.

In this normal utterance processing, the voice-user interface device 30 transmits the voice data of the utterance to the voice assistance server 40 (S203A). The voice assistance server 40 analyzes the voice data of the utterance from the voice-user interface device 30 and generates a request message depending on the analysis result.

The processing server 50 receives this request message, and the processing of step S203B is executed. In other words, the processing unit 502 extracts the voice response data on the basis of the request message and transmits the extracted data to the voice assistance server 40. In the voice assistance server 40, the voice data for the response is generated on the basis of the voice response data and is transmitted to the voice-user interface device 30.

In the voice-user interface device 30, the voice response output control unit 304 causes the speaker 302 to output the response voice corresponding to the voice data for the response from the voice assistance server 40. This makes it possible for the viewer 2 to check the response voice output from the voice-user interface device 30.

In the second case, in the determination processing of step S202, in a case where it is determined that the instruction to stop the output of the response voice is made, for example, such as the utterance of "wait for a moment!", the processing proceeds to step S204, and the stop utterance processing is executed.

In this stop utterance processing, the voice-user interface device 30 executes the processing operations of steps S204A to S204C. In other words, the voice analysis unit 308 notifies (notices) the voice response output control unit 304 to stop the output of the response voice (S204A).

This causes the voice response output control unit 304 to stop the response voice currently being output from the speaker 302 in accordance with the notification from the voice analysis unit 308 (S204B). In this event, the voice response output control unit 304 causes the buffer 306 to temporarily hold the voice data for the response.

Further, the voice response output control unit 304 notifies the reception apparatus 20 that the output of the response voice is in the waiting state (S204C). The notification indicating the waiting state is received by the reception apparatus 20 using wireless communication such as Bluetooth (registered trademark), and the processing of step S204D is executed.

In other words, the voice response waiting notification unit 213 instructs the renderer 205 to display the waiting icon on the basis of the notification indicating the waiting state from the voice-user interface device 30 (the voice response output control unit 304 thereof) (S204D). This allows the waiting icon 251 to be displayed on the screen of the display 206 of the reception apparatus 20, and so the viewer 2 is able to check that the response voice is in the waiting using the viewer's own utterance.

In the third case, in the determination processing in step S202, in a case where it is determined that the instruction to start the output of the response voice is made, for example, such as the utterance of "It's okay now", the processing proceeds to step S205 and the start utterance processing is executed.

In this start utterance processing, the voice-user interface device 30 executes the processing of steps S205A to S205C. In other words, the voice analysis unit 308 causes the voice response output control unit 304 to notify to start the output of the response voice (S205A).

This allows the voice response output control unit 304 causes the speaker 302 to output the response voice corresponding to the voice data for the response temporarily held in the buffer 306 in accordance with the notification from the voice analysis unit 308, and restarts the output of the response voice in waiting (S205B).

Further, the voice response output control unit 304 notifies the reception apparatus 20 that the output of the response voice in waiting is released (S205C). The reception apparatus 20 receives the notification indicating the release state and the processing of step S205D is executed.

In other words, the voice response waiting notification unit 213 instructs the renderer 205 to delete the waiting icon on the basis of the notification indicating the release state from the voice-user interface device 30 (S205D). This allows the waiting icon 251 on the screen of the display 206 of the reception apparatus 20 to be erased.

For example, in the case where the viewer 2 causes the output of the response voice to be waited by during viewing the drama program until the TV advertisement, the viewer 2 is able to utter an instruction to start the output of the response voice. Accordingly, the viewer 2 is able to check the response voice of "This actress's name is XXXX and the main featured work is . . . ". This makes it possible for the viewer 2 to listen to the response voice (information to want to know) at the timing that the viewer wants to hear.

The above description is given of the processing procedure in the case of controlling the timing of the voice response on the basis of the instruction utterance from the viewer 2 as the processing procedure in each device of the second embodiment.

Moreover, the waiting icon is an example of information indicating that the output of the response voice is in the waiting state, and other types of information can be used as long as the information that can be notified that it is in the waiting state. In addition, for example, in the reception apparatus 20 or the voice-user interface device 30, the lighting of a lamp can be used as the waiting information.

(3) Third Embodiment

By the way, in the first embodiment, the system side controls the timing of the voice response to the utterance of the viewer on the basis of the voice response time information. Thus, it is assumed that some people want to hear the voice response at the desired timing depending on the viewer 2. In other words, the configuration shown in the first embodiment can also perform control of the timing of the voice response on the basis of the instruction utterance from the viewer 2, which is similar to the configuration shown in the second embodiment.

Thus, a configuration that controls the timing of the voice response on the basis of the voice response timing metadata (voice response time information) acquired via communication or broadcasting and the instruction utterance from the viewer 2 is then illustrated as a third embodiment referring to FIGS. 17 to 20.

(First Example of Detailed Configuration of Each Device)

Figure 17:
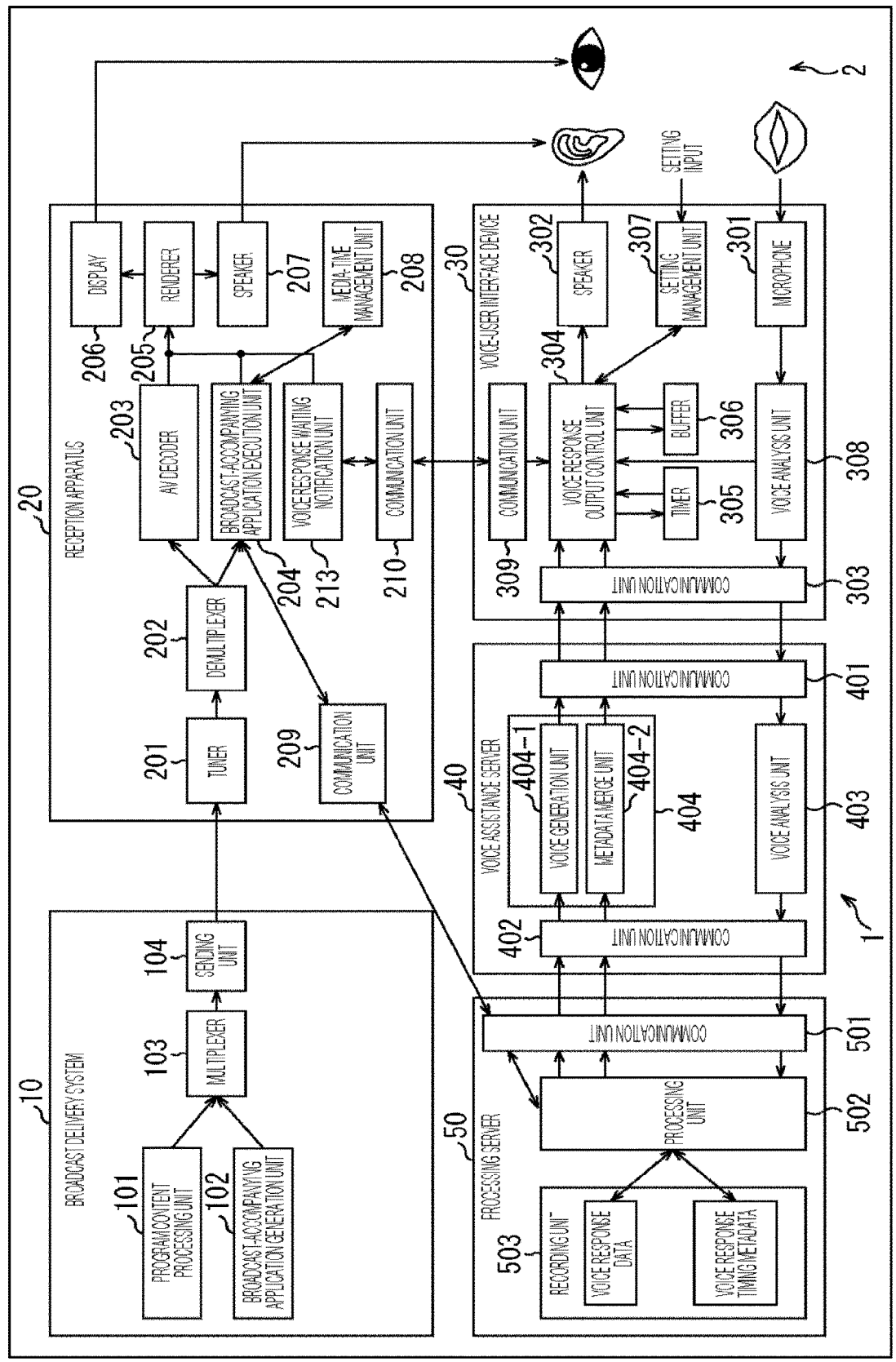
FIG. 17 is a block diagram illustrating a first example of a detailed configuration of each device according to a third embodiment.

FIG. 17 is a block diagram illustrating a first example of a detailed configuration of each device according to the third embodiment.

FIG. 17 shows, similarly to FIGS. 4 and 15, an example of the configurations of the broadcast delivery system 10 and the reception apparatus 20, in addition, FIG. 17 shows an example of the configuration of the voice-user interface device 30 provided on the local side and the configurations of the voice assistance server 40 and the processing server 50 provided on the cloud side.

Moreover, in FIG. 17, the broadcast delivery system 10, the voice assistance server 40, and the processing server 50 are similar in configuration to those illustrated in FIG. 4, and so the description thereof is omitted.

In FIG. 17, the reception apparatus 20 includes a tuner 201, a demultiplexer 202, an AV decoder 203, a broadcast-accompanying application execution unit 204, a renderer 205, a display 206, a speaker 207, a media-time management unit 208, a communication unit 209, a communication unit 210, and a voice response waiting notification unit 213. In other words, the configuration of the reception apparatus 20 shown in FIG. 17 is added with the voice response waiting notification unit 213 and the communication unit 210, as compared with the configuration shown in FIG. 4.

The voice response waiting notification unit 213, in a case of receiving the notification indicating the waiting state from the voice-user interface device 30 (the voice response output control unit 304 thereof), instructs the renderer 205 to display the waiting icon, and in a case of receiving the notification indicating the release state, instructs the renderer 205 to delete the waiting icon.

In FIG. 17, the voice-user interface device 30 includes a microphone 301, a speaker 302, a communication unit 303, a voice response output control unit 304, a timer 305, a buffer 306, a setting management unit 307, a voice analysis unit 308, and a communication unit 309.

In other words, in the configuration of the voice-user interface device 30 shown in FIG. 17, the voice analysis unit 308 and the communication unit 309 are added as compared with the configuration shown in FIG. 4.

The voice response output control unit 304, when waiting until the voice response timing on the basis of the voice response timing metadata (voice response time information) acquired via communication, causes the reception apparatus 20 (the voice response waiting notification unit 213 thereof) to make a notification indicating the waiting state. In addition, the voice response output control unit 304, when being instructed to start (restart) the output of the response voice on the basis of the notification from the voice analysis unit 308, causes the output of the response voice in the waiting state (in the stop state) to be started (restarted). At this time, the voice response output control unit 304 controls so that a notification indicating that the released state is given to the reception apparatus 20 (the voice response waiting notification unit 213 thereof) on the basis of the notification from the voice analysis unit 308.

(Procedure of First Example of Processing in Each Device)

The procedure of the first example of the processing in each device of the third embodiment is now described with reference to the flowchart of FIG. 18.

In a case where the viewer 2 who is watching the broadcast program being played in the reception apparatus 20 utters a question, the processing operations of steps S301 to S303 are executed.

Figure 8:
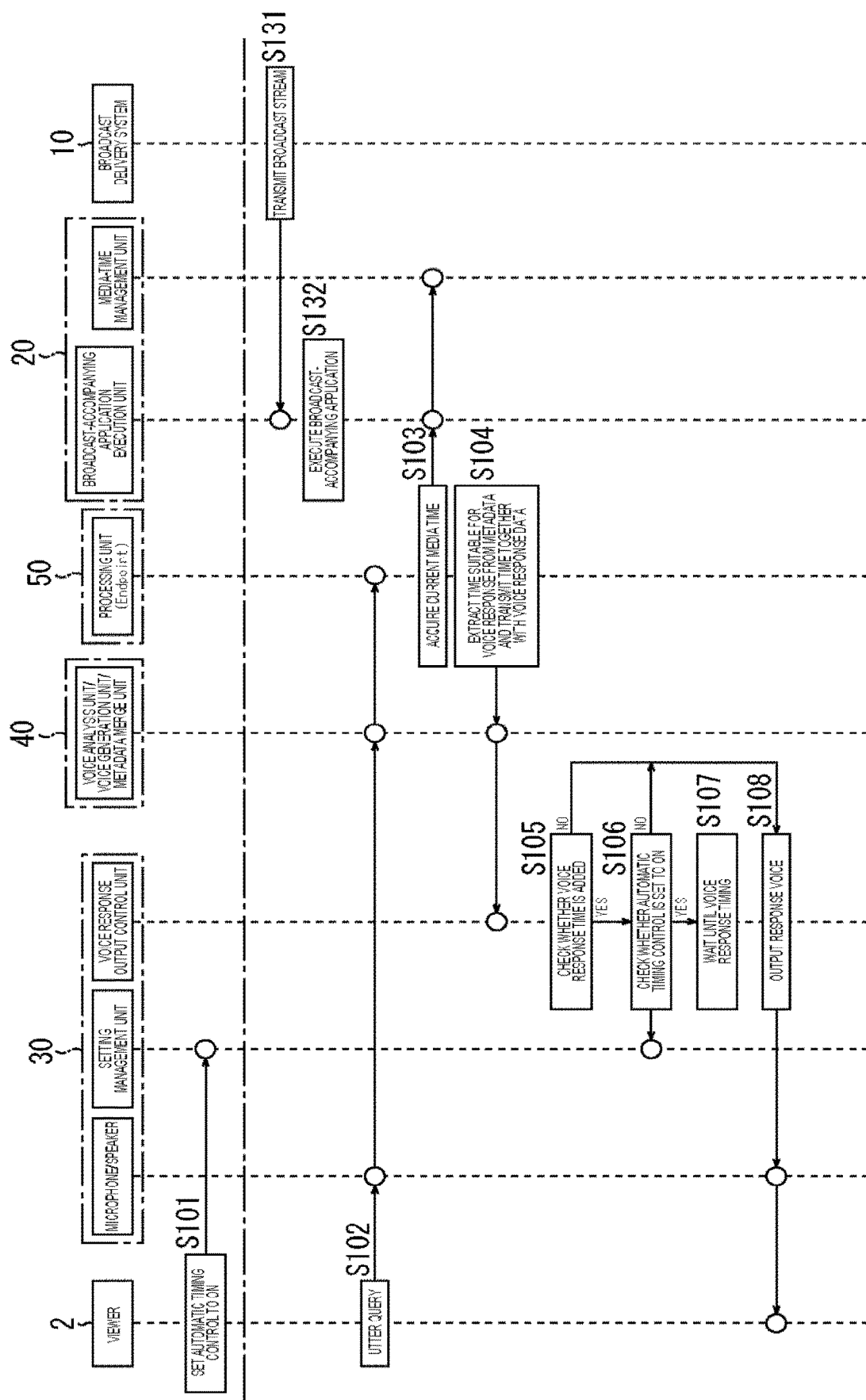
FIG. 8 is a flowchart illustrated to describe a flow of a first example of the processing procedure in each device according to the first embodiment.

In steps S301 to S303, which are similar to steps S102 to S107 in FIG. 8 described above, the request message corresponding to the analysis result of the voice data of the utterance is transmitted to the processing server 50. In the processing server 50, on the basis of the current media time acquired from the reception apparatus 20, the voice response time information indicating the time suitable for voice response is extracted from the voice response timing metadata (metadata of the entire program), and the voice response data corresponding to the request message is transmitted (S301 and S302).

Then, the voice data for the response and the voice response timing metadata (voice response time information) are received by the voice-user interface device 30 via the Internet 60. The voice response output control unit 304 waits until the voice response timing on the basis of the voice response timing metadata (voice response time information) acquired via communication (S303).

In step S304, the voice response output control unit 304 notifies the reception apparatus 20 that the output of the response voice is in the waiting state. The notification indicating that it is in the waiting state is received by the reception apparatus 20 and the processing of step S305 is executed.

In other words, the voice response waiting notification unit 213 instructs the renderer 205 to display the waiting icon on the basis of the notification indicating the waiting state from the voice-user interface device 30 (the voice response output control unit 304 thereof) (S305). This allows the waiting icon 251 to be displayed on the screen of the display 206 of the reception apparatus 20, and so the viewer 2 is able to check that the response voice is in the waiting.

In this description, for example, when the viewer 2 checks the waiting icon 251 and notices that the voice response is in the waiting state, it is considered that the utterance of the instruction to start the output of the response voice (e.g., such as "It's okay now") is made (S306 and S307).

In this event, in the voice-user interface device 30, the voice analysis unit 308 analyzes the voice data of the utterance picked by the microphone 301, and the processing operations of steps S308 to S310 are executed. In other words, the voice analysis unit 308 notifies the voice response output control unit 304 to start outputting the response voice (S308).

This allows the voice response output control unit 304 causes the speaker 302 to output the response voice corresponding to the voice data for the response temporarily held in the buffer 306 in accordance with the notification from the voice analysis unit 308, and restarts the output of the response voice in waiting (S309).

Further, the voice response output control unit 304 notifies the reception apparatus 20 that the output of the response voice in waiting is released (S310). The reception apparatus 20 receives the notification indicating the release state and the processing of step S311 is executed.

In other words, the voice response waiting notification unit 213 instructs the renderer 205 to delete the waiting icon 251 on the basis of the notification indicating the release state from the voice-user interface device 30 so that the waiting state displayed on the screen of the display 206 is deleted (S311).

Moreover, this example assumes that the viewer 2 who notices the waiting icon 251 utters the start instruction. However, in a case where the utterance of the start instruction is not made, for example, when the time indicated by the voice response time information is reached thereafter, the response voice is output from the speaker 302.

The above description is given of, as the procedure of the first example of the processing in each device of the third embodiment, the procedure of processing in the case of controlling the timing of the voice response on the basis of the voice response timing metadata (voice response time information) acquired via communication and the instruction utterance from the viewer 2.

(Second Example of Detailed Configuration of Each Device)

Figure 19:
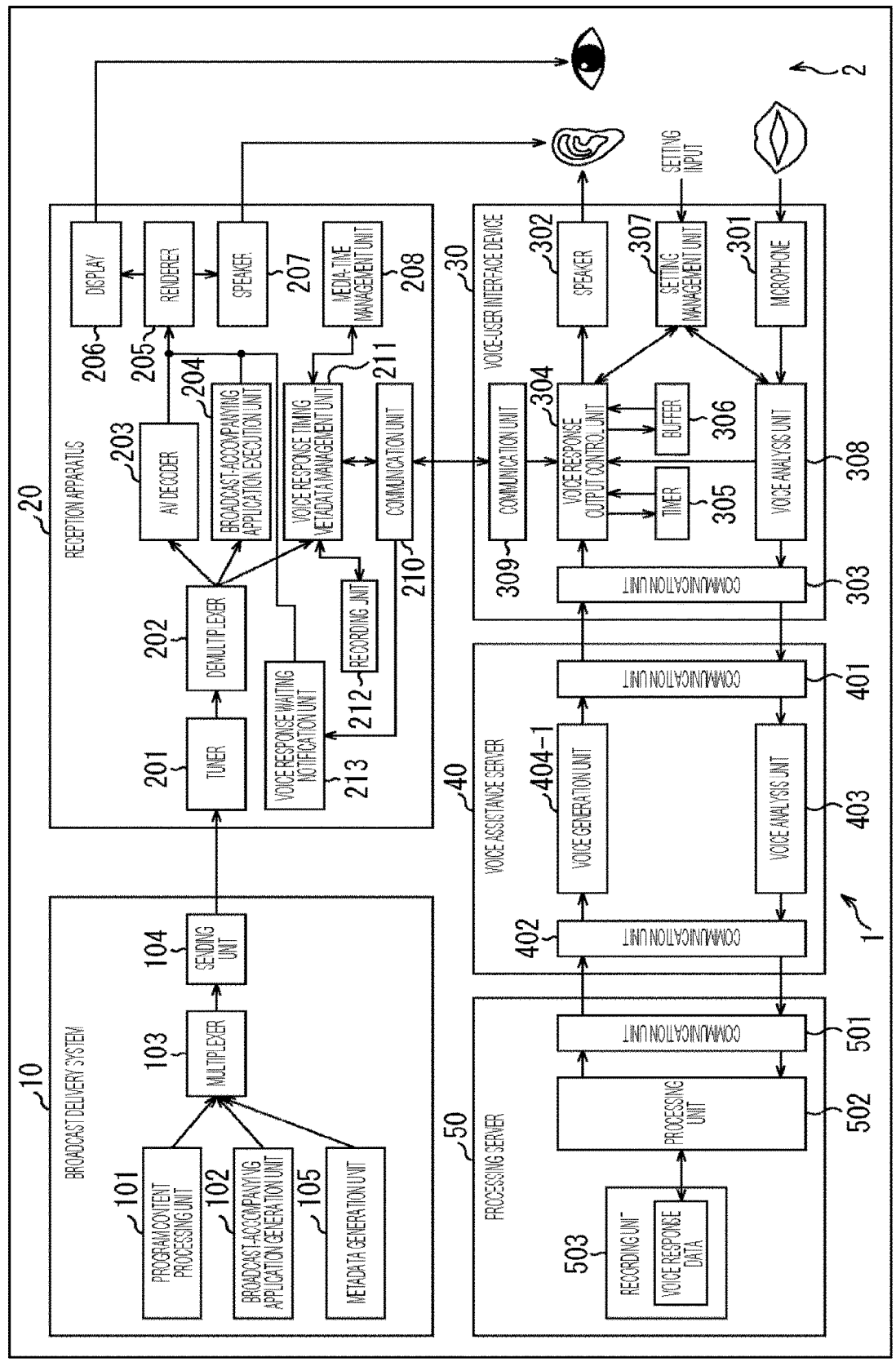
FIG. 19 is a block diagram illustrating a second example of a detailed configuration of each device according to the third embodiment.

FIG. 19 is a block diagram illustrating a second example of a detailed configuration of each device according to the third embodiment.

FIG. 19 shows, similarly to FIGS. 10 and 15, an example of the configurations of the broadcast delivery system 10 and the reception apparatus 20, in addition, FIG. 19 shows an example of the configuration of the voice-user interface device 30 provided on the local side and the configurations of the voice assistance server 40 and the processing server 50 provided on the cloud side.

Moreover, in FIG. 19, the broadcast delivery system 10, the voice assistance server 40, and the processing server 50 are similar in configuration to those illustrated in FIG. 10, and so the description thereof is omitted.

In FIG. 19, the reception apparatus 20 includes a tuner 201, a demultiplexer 202, an AV decoder 203, a broadcast-accompanying application execution unit 204, a renderer 205, a display 206, a speaker 207, a media-time management unit 208, a communication unit 210, a voice response timing metadata management unit 211, a recording unit 212, and a voice response waiting notification unit 213. In other words, the configuration of the reception apparatus 20 shown in FIG. 19 is added with the voice response waiting notification unit 213, as compared with the configuration shown in FIG. 10.

The voice response waiting notification unit 213, in a case of receiving the notification indicating the waiting state from the voice-user interface device 30 (the voice response output control unit 304 thereof), instructs the renderer 205 to display the waiting icon, and in a case of receiving the notification indicating the release state, instructs the renderer 205 to delete the waiting icon.

In FIG. 19, the voice-user interface device 30 includes a microphone 301, a speaker 302, a communication unit 303, a voice response output control unit 304, a timer 305, a buffer 306, a setting management unit 307, a voice analysis unit 308, and a communication unit 309. In other words, the voice-user interface device 30 shown in FIG. 19 has the configuration similar to the voice-user interface device 30 shown in FIG. 10, but the details of the processing by the voice response output control unit 304 and the voice analysis unit 308 are different.

The voice response output control unit 304, when waiting until the voice response timing on the basis of the voice response timing metadata (voice response time information) acquired via broadcasting, causes the reception apparatus 20 (the voice response waiting notification unit 213 thereof) to make a notification indicating the waiting state. In addition, the voice response output control unit 304, when being instructed to start (restart) the output of the response voice on the basis of the notification from the voice analysis unit 308, causes the output of the response voice in the waiting state (in the stop state) to be started (restarted). At this time, the voice response output control unit 304 controls so that a notification indicating that the released state is given to the reception apparatus 20 (the voice response waiting notification unit 213 thereof) on the basis of the notification from the voice analysis unit 308.

(Procedure of Second Example of Processing in Each Device)

Figure 20:
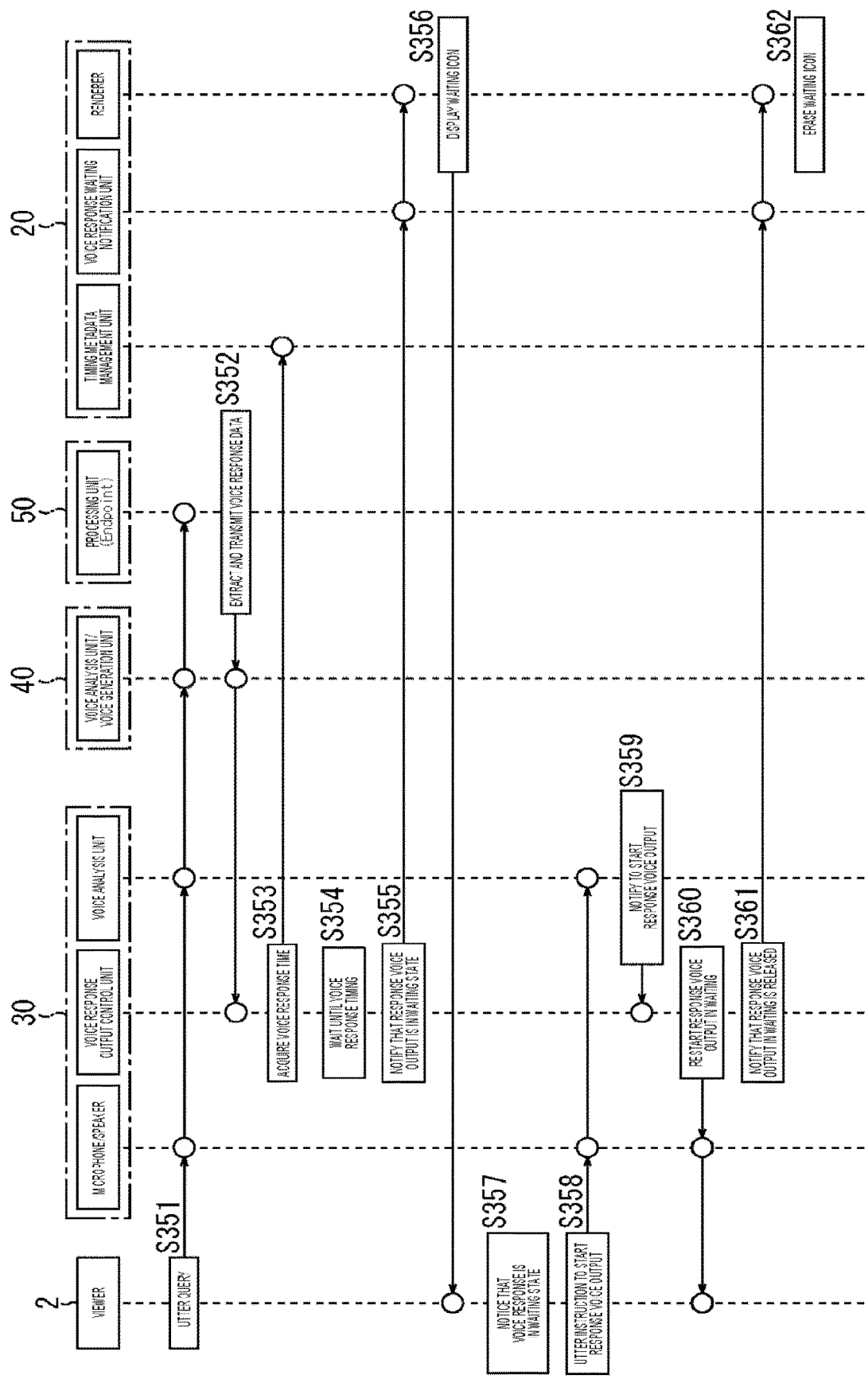
FIG. 20 is a flowchart illustrated to describe a flow of a second example of the processing procedure in each device according to the third embodiment.

The procedure of the second example of the processing in each device of the third embodiment is now described with reference to the flowchart of FIG. 20.

In a case where the viewer 2 who is watching the broadcast program being played in the reception apparatus 20 utters a question, the processing operations of steps S351 to S354 are executed.

Figure 13:
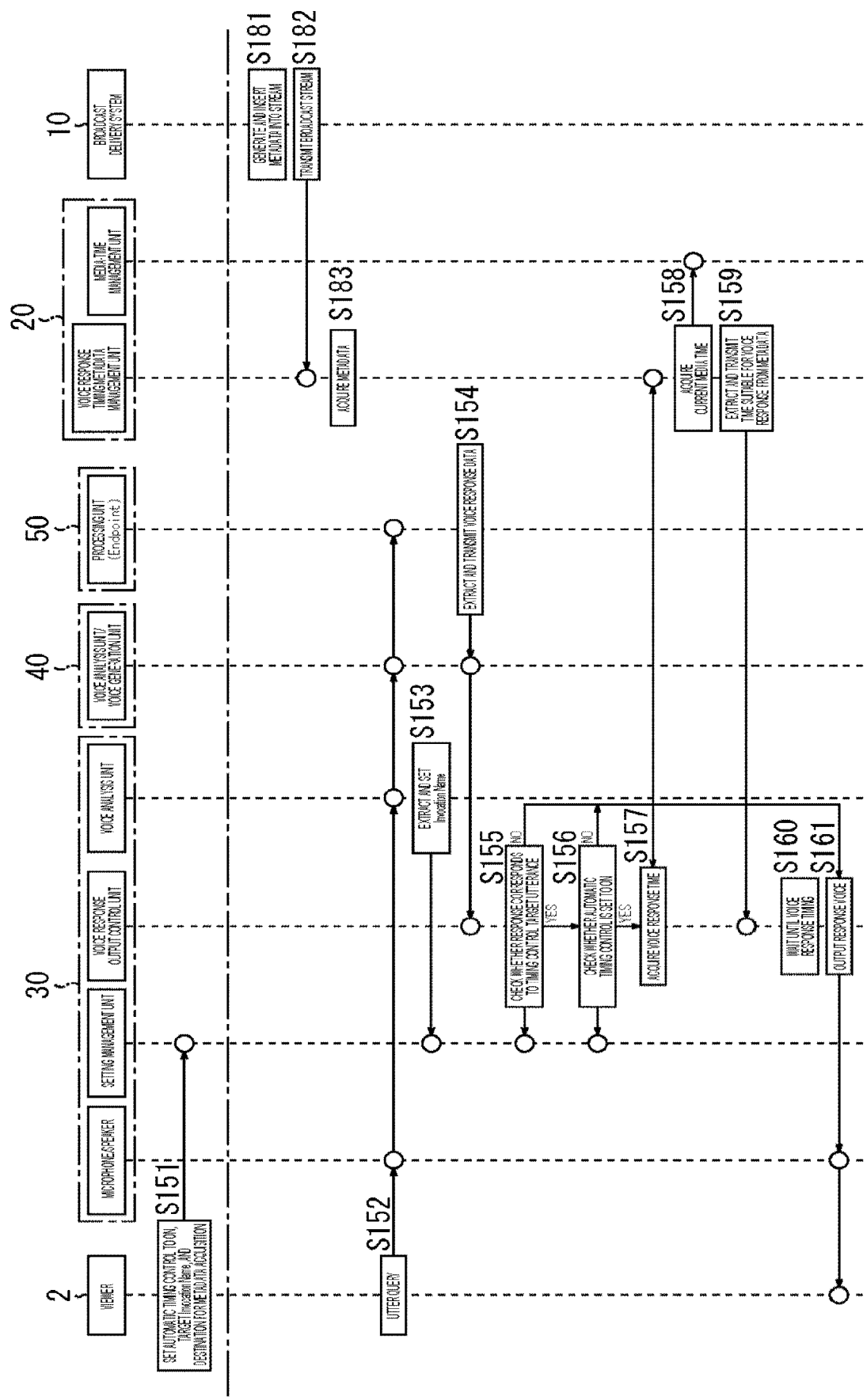
FIG. 13 is a flowchart illustrated to describe a flow of a second example of the processing procedure in each device according to the first embodiment.

In steps S351 to S354, similarly to steps S152 to S160 in FIG. 13 described above, the request message corresponding to the analysis result of the voice data of the utterance is transmitted to the processing server 50, and the voice response data corresponding to the request message is transmitted (S351 and S352).

On the other hand, in the voice-user interface device 30, in the case where the voice data of the received response is a response to the timing control target utterance, the voice response timing metadata (voice response time information) is acquired from the reception apparatus 20 (S353). Accordingly, the voice response output control unit 304 waits until the voice response timing on the basis of the voice response timing metadata (voice response time information) acquired via broadcasting (S354).

Figure 18:
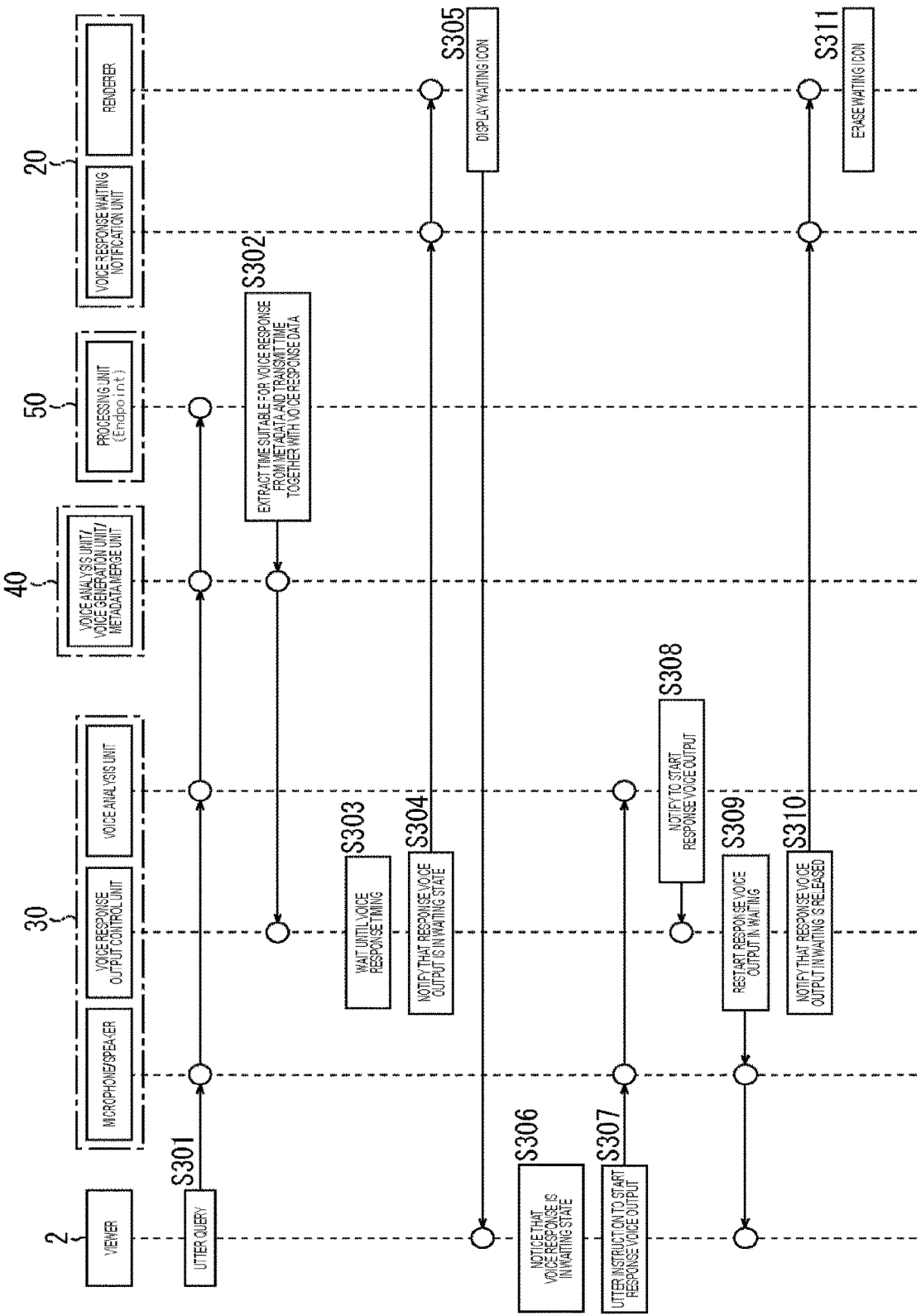
FIG. 18 is a flowchart illustrated to describe a flow of a first example of the processing procedure in each device according to the third embodiment.

In steps S355 to S356, similarly to steps S304 to S305 in FIG. 18 described above, the voice response output control unit 304 notifies that the output of the response voice is in the waiting state, and in the reception apparatus 20 receiving this notification, the voice response waiting notification unit 213 instructs to display the waiting icon.

Further, in steps S357 to S362, similarly to steps S306 to S311 in FIG. 18 described above, in the case where the viewer 2 utters the instruction to start the output of the response voice, in the voice-user interface device 30, the output of the response voice that is in the waiting state is restarted. In addition, in this event, the voice response output control unit 304 notifies that the output of the response voice is in the released state, and in the reception apparatus 20 receiving this notification, the voice response waiting notification unit 213 makes an instruction to delete the displayed waiting icon.

The above description is given of, as the procedure of the second example of the processing in each device of the third embodiment, the procedure of processing in the case of controlling the timing of the voice response on the basis of the voice response timing metadata (voice response time information) acquired via broadcasting and the instruction utterance from the viewer 2.

As described above, in the third embodiment, there is the case where the voice response output control unit 304 of the voice-user interface device 30 uses the voice AI assistance service in cooperation with the content such as broadcast programs. In this case, the timing of the voice response is controlled on the basis of the voice response time information indicating the time suitable for the voice response to the utterance of the viewer who watches the content, and the viewer's utterance.

Further, in the voice-user interface device 30, the voice response output control unit 304, when waiting until the timing of the voice response is reached, is capable of causing the information indicating that it is in the waiting state to be presented. Furthermore, the voice response output control unit 304 is capable of causing the voice response that is in the waiting state to be started in the case where the viewer gives an instruction to start the voice response.

Further, the voice response output control unit 304, in a case of waiting for the timing of the voice response, issues a notification indicating the waiting state (the first message) to the reception apparatus 20 (the first device) that is playing the content such as broadcast programs. In the reception apparatus 20 (the first device), the waiting icon 251 (icon) is to be displayed on the basis of the notification indicating the waiting state (the first message). In the case where the viewer makes an instruction to start the voice response, a notification indicating the release state (the second message) is given to the reception apparatus 20 (the first device). In the reception apparatus 20 (the first device), it is possible to cause the display of the waiting icon 251 (icon) to be deleted on the basis of the notification indicating the release state (the second message).

It can be said that the voice-user interface device 30 having such function is an information processing apparatus including the voice response output control unit 304.

As described above, in the configuration shown in the first embodiment, the timing of the voice response is automatically controlled on the system side. Thus, for example, there is a possibility that it can be a redundant intervention for the viewer who wants to hear early the response voice because it is okay that it overlaps with the conversation of the main part. Thus, in the configuration of the third embodiment, even during the voice-user interface device 30 is waiting for the output of the response voice on the basis of the voice response time information, the reception apparatus 20 is caused to display the waiting icon, which is similar to the second embodiment. The viewer who wants to hear early the response voice checks the waiting icon and, when recognizing that the output of the response voice is in the waiting state, utters the start instruction of the response voice output such as "It's okay now!", which enables the response voice to be heard immediately. Moreover, if the automatic timing adjustment is appropriate for the viewer, there is also a merit that redundant interaction is not necessary unlike the configuration of the second embodiment.

3. Modifications (Example of Other Configuration)

The above description is given that the reception apparatus 20 and the voice-user interface device 30 are different devices. However, for example, as illustrated in FIG. 21, these devices can be integrated to form one device (an information processing apparatus).

Figure 21:
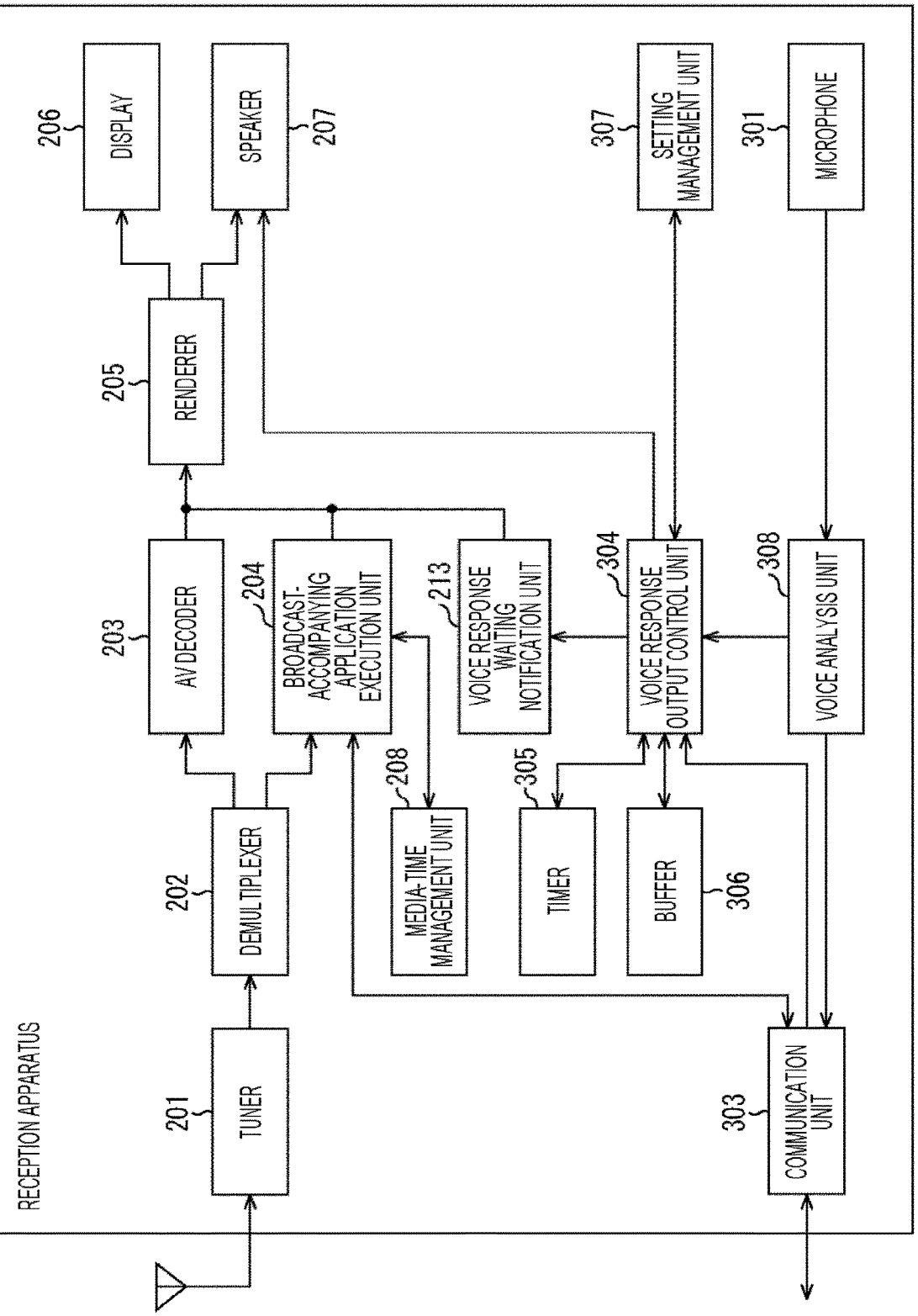
FIG. 21 is a block diagram illustrating an example of another configuration of a reception apparatus.

In other words, the reception apparatus 20 illustrated in FIG. 21 is a device such as a television set or a smartphone that supports the voice AI assistance service. The reception apparatus 20 is provided with, in addition to the tuner 201 to the media-time management unit 208 and the voice response waiting notification unit 213, a microphone 301, a communication unit 303, a voice response output control unit 304, a timer 305, a buffer 306, a setting management unit 307, and a voice analysis unit 308 on the side of the voice-user interface device 30. However, in FIG. 21, the speaker 207 is also used as the speaker 302 on the side of the voice-user interface device 30. In addition, the communication unit 303 is also used as the communication unit 209 on the side of the reception apparatus 20.

In the reception apparatus 20 shown in FIG. 21, the voice response output control unit 304 controls the timing of the voice response on the basis of the voice response time information. In addition, the voice response waiting notification unit 213 presents the waiting icon.

Moreover, the configuration in which the reception apparatus 20 is compatible with the voice AI assistance service is described with reference to FIG. 21. However, functions of the voice response waiting notification unit 213 or the like are provided on the side of the voice-user interface device 30, and the necessary information can be acquired from the side of the reception apparatus 20. In addition, although the configuration corresponding to the third embodiment is illustrated in FIG. 21, the reception apparatus 20 and the voice-user interface device 30 can be integrated, which is similar to the first and second embodiments.

Further, as the function for providing the voice AI assistance service, there are functions on the local side (e.g., such as the function of the voice response output control unit 304 or the voice analysis unit 308) and functions on the cloud side (e.g., such as functions of the voice analysis unit 403 and the voice generation unit 404-1, the metadata merge unit 404-2) However, all of those functions can be implemented in a device (a terminal) on the local side or a device (a server) on the cloud side, or some of those functions can be implemented in a device (a terminal) on the local side or a device (a server) on the cloud side.

Further, in the content-voice AI cooperation system 1 of FIG. 1 described above, the case where one reception apparatus 20 (e.g., a television set) and one voice-user interface device 30 (a smart speaker) are installed in the viewer's house is illustrated. However, for example, it is possible to provide the reception apparatus 20 and the voice-user interface device 30 to which the present technology is applied for each viewer's house. In addition, although it is assumed that the reception apparatus 20 and the voice-user interface device 30 are installed in the same room at the viewer's house, they can be installed in different rooms. Furthermore, a plurality of voice-user interface devices 30 can be provided for one reception apparatus 20, or conversely, a plurality of reception apparatuses 20 can be provided for one voice-user interface device 30.

Furthermore, in the content-voice AI cooperation system 1 of FIG. 1 described above, the case where one voice assistance server 40 and one processing server 50 are installed is illustrated, but, for example, a plurality of these servers can be installed for each function or provider (e.g., broadcaster). On the other hand, the entirety or a part of the functions of the voice assistance server 40 and the processing server 50 can be integrated and provided by one or a plurality of servers.

(Example of Broadcasting System)

As a broadcasting system for transferring a broadcasting signal (a digital broadcasting signal) sent from the broadcast delivery system 10 to the reception apparatus 20, for example, it is possible to apply advanced television systems committee (ATSC) that is a system adopted in the United States or the like. In addition to that, it is possible to apply integrated services digital broadcasting (ISDB), which is a system employed by Japan and others, or digital video broadcasting (DVB), which is a system employed by European countries or the like. In addition, the transmission path is not limited to terrestrial broadcasting, and for example, it can also be applied to satellite broadcasting using broadcasting satellites (BS), communications satellites (CS), or the like or wire broadcast such as cable television (CATV).

Further, the above-described broadcast delivery system 10 includes one or a plurality of broadcast servers or the like. For example, in a general digital broadcast system, the multiplexer 103 (the multiplexer server) and the sending unit 104 (the sending server) can be installed in different places. More specifically, for example, the multiplexer 103 is installed in the broadcast station, while the sending unit 104 is installed in the transmitting station. Furthermore, the program content processing unit 101 (the program content server), the broadcast-accompanying application generation unit 102 (the broadcast-accompanying application server), and the metadata generation unit 105 (the metadata server) can be installed in the same location (e.g., a place inside the broadcast station) as the multiplexer 103 (the multiplexer server) or in different places (e.g., a place outside the broadcast station).

(Example of Content Application)

Moreover, in the above description, programs and Ads are exemplified as the content to be delivered, but content to which the present technology is applied includes not only moving images or music but also any types of content applications such as electronic books, games, and advertisements. In addition, in the above, the delivery via the broadcast by the broadcast delivery system 10 is described as the delivery route of the content, but a communication distribution system that provides over-the-top (OTT) services or the like can deliver streaming via communication. Furthermore, all components (e.g., such as video, audio, or subtitle) that includes content such as programs can be delivered via broadcasting or communication, or a part of the components can be delivered via broadcasting or communication (the remaining part is delivered via communication or broadcasting).

Further, the broadcast-accompanying application can be, for example, an application developed in a markup language such as HTML5 or a scripting language such as JavaScript (registered trademark), but is not limited thereto. For example, it can be an application developed in a programming language such as Java (registered trademark). In addition, the broadcast-accompanying application is not limited to applications executed by the browser (the broadcast-accompanying application execution unit 204), but can be executed as a so-called native application in an operating system (OS) environment or the like.

Furthermore, the above description is given of the case where the broadcast-accompanying application is delivered via broadcasting by the broadcast delivery system 10, it is not limited thereto. For example, an application server that generates the broadcast-accompanying application can deliver it via communication (via the Internet 60). In addition, the above description is given that the broadcast-accompanying application is in conjunction with the content delivered via broadcasting, but it can be an application executed in conjunction with the content delivered via communication.

(Others)

Moreover, the terms used herein are examples, and in practice, other terms are used in some cases. However, the difference in these terms is a formal difference, and the substantial contents of the objects are not different. For example, the above-mentioned "skill" is referred to as "action", "application", or the like in some cases. Further, the above-mentioned "AI assistance service" is referred to as "AI assistant service" or the like, in some cases.

4. Configuration of Computer

Figure 22:
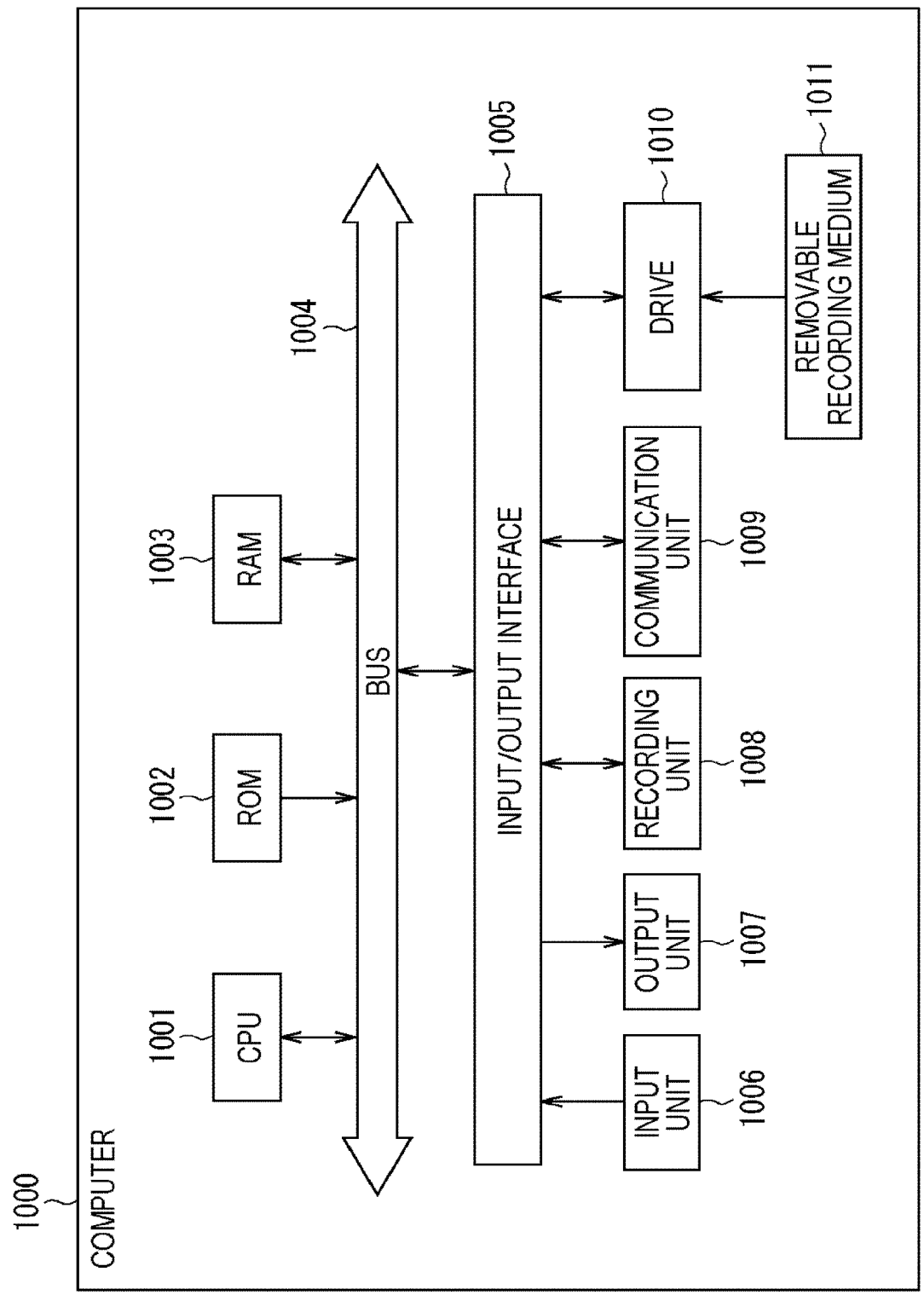
FIG. 22 is a diagram illustrating an example of the configuration of a computer.

A series of processes described above can be executed by hardware or software. In a case where a series of processes is executed by software, a program constituting the software is installed in a computer. FIG. 22 is a diagram illustrating an exemplary hardware configuration of a computer that executes a series of processing described above by a program.

In this computer 1000, a central processing unit (CPU) 1001, a read only memory (ROM) 1002, and a random access memory (RAM) 1003 are connected to one another by a bus 1004. An input/output interface 1005 is further connected to the bus 1004. An input unit 1006, an output unit 1007, a recording unit 1008, a communication unit 1009, and a drive 1010 are connected to the input/output interface 1005.

The input unit 1006 includes a keyboard, a mouse, a microphone, or the like. The output unit 1007 includes a display, a speaker, or the like. The recording unit 1008 includes a hard disk, a nonvolatile memory, or the like. The communication unit 1009 includes a network interface or the like. The drive 1010 drives a removable recording medium 1011 such as a magnetic disk, an optical disk, a magneto-optical disk, or a semiconductor memory.

In the computer 1000 configured as described above, the CPU 1001 loads a program that is recorded in the ROM 1002 or the recording unit 1008 onto the RAM 1003 via the input/output interface 1005 and the bus 1004, and executes the program. Thus, the above-described series of processing is performed.

Programs to be executed by the computer 1000 (the CPU 1001) are provided being recorded in the removable recording medium 1011 which is a packaged medium or the like, for example. Also, programs may be provided via a wired or wireless transmission medium, such as a local area network, the Internet or digital satellite broadcasting.

In the computer 1000, the program can be installed on the recording unit 1008 via the input/output interface 1005 by mounting the removable recording medium 1011 on the drive 1010. In addition, the program can be received by the communication unit 1009 via a wired or wireless transmission medium and can be installed on the recording unit 1008. Additionally, the program can be installed in advance on the ROM 1002 or the recording unit 1008.

Here, in the present specification, processes executed by the computer in accordance with the program may not necessarily be executed chronologically in the order described as a flowchart. That is, the processes executed by the computer in accordance with the program also include processes executed in parallel or individually (for example, parallel processes or processes by objects). In addition, the program may be processed by one computer (processor) or may be distributed and processed by a plurality of computers.

In addition, an embodiment of the present technology is not limited to the embodiments described above, and various changes and modifications may be made without departing from the scope of the present technology.

Additionally, the present technology may also be configured as below.

(1)
An information processing apparatus including
a control unit configured to control a timing of a voice response upon using a voice AI assistance service in cooperation with content on the basis of voice response time information indicating time suitable for the voice response to an utterance of a viewer watching the content.

(2)
The information processing apparatus according to (1),
in which the voice response time information is information indicating the time suitable for the voice response on a playback time axis of the content.

(3)
The information processing apparatus according to (1) or (2),
in which the voice response time information is acquired via communication.

(4)
The information processing apparatus according to (3),
in which the content is played back by a first device,
the voice response time information is delivered by a second device via communication,
the second device extracts the voice response time information indicating the time suitable for the voice response to the content being played in the first device from metadata including the voice response time information intended for an entirety or a part of time on the playback time axis of the content, and
the control unit controls the timing of the voice response on the basis of the voice response time information delivered via communication.

(5)
The information processing apparatus according to (1) or (2),
in which the voice response time information is acquired via broadcasting.

(6)
The information processing apparatus according to (5),
in which the content is played back by a first device,
the voice response time information is delivered by a second device via broadcasting,
the second device delivers metadata including the voice response time information intended for an entirety or a part of time on the playback time axis of the content,
the first device extracts the voice response time information indicating the time suitable for the voice response to the content being played from the metadata delivered via broadcasting, and
the control unit controls the timing of the voice response on the basis of the voice response time information extracted by the first device.

(7)
The information processing apparatus according to any one of (1) to (6),
in which the control unit controls the timing of the voice response on the basis of the utterance of the viewer.

(8)
The information processing apparatus according to (7),
in which the control unit, upon waiting until the timing of the voice response is reached, causes information indicating a waiting state to be presented.

(9)
The information processing apparatus according to (7),
in which the control unit, upon receiving an instruction to start the voice response from the viewer, causes the voice response in the waiting state to be started.

(10)

The information processing apparatus according to (9), in which the control unit, upon waiting until the timing of the voice response is reached, notifies a first device playing back the content of a first message indicating the waiting state, the first device causes an icon indicating the waiting state to be displayed on the basis of the notified first message, the control unit, upon receiving the instruction to start the voice response from the viewer, notifies the first device of a second message indicating that the waiting state of the voice response is released, and the first device causes the displayed icon indicating the waiting state to be erased on the basis of the notified second message.

(11)

The information processing apparatus according to (2), in which the voice response time information includes, as the time suitable for the voice response, time during which an uttered voice of the content being played is not output.

(12)

The information processing apparatus according to any one of (1) to (11), in which the content is broadcast content delivered via broadcasting, and the voice response is a response to the utterance of the viewer viewing the broadcast content.

(13)

The information processing apparatus according to (3) or (4), in which the voice response time information is delivered via communication together with voice data of the voice response using an HTTP response.

(14)

The information processing apparatus according to (5) or (6), in which the content is delivered via broadcasting as a stream compliant with MPEG-DASH, and the voice response time information is delivered via broadcasting using an MPD.

(15)

The information processing apparatus according to any one of (1) to (14), in which the information processing apparatus is configured as a voice processing device configured to function as a user interface for the voice AI assistance service.

(16)

The information processing apparatus according to any one of (1) to (14), in which the information processing apparatus is configured as a reception apparatus configured to receive and playback the content delivered via broadcasting.

(17)

An information processing method executed by an information processing apparatus, the method including:

controlling, by the information processing apparatus, a timing of a voice response upon using a voice AI assistance service in cooperation with content on the basis of voice response time information indicating time suitable for the voice response to an utterance of a viewer watching the content.

(18)

A transmission apparatus including:

a generation unit configured to generate, upon using a voice AI assistance service in cooperation with content, metadata including voice response time information indicating time suitable for a voice response to an utterance of a viewer watching the content; and a transmission unit configured to transmit the generated metadata.

(19)

The transmission apparatus according to (18), in which the generation unit generates an MPD in which the voice response time information intended for an entirety or a part of time on a playback time axis of the content is expressed to be identifiable by identification information being used to identify as being used for the voice AI assistance service, and the transmission unit delivers, together with the MPD, the content as a stream compliant with MPEG-DASH via broadcasting.

(20)

A transmission method executed by a transmission apparatus, the method including:

generating, by the transmission apparatus, upon using a voice AI assistance service in cooperation with content, metadata including voice response time information indicating time suitable for the voice response to an utterance of a viewer watching the content; and transmitting, by the transmission apparatus, the generated metadata.

REFERENCE SIGNS LIST

1 Content-voice AI cooperation system
10 Broadcast delivery system
20 Reception apparatus
30 Voice-user interface device
40 Voice assistance server
50 Processing server
60 Internet
70 Network
101 Program content processing unit
102 Broadcast-accompanying application generation unit
103 Multiplexer
104 Sending unit
105 Metadata generation unit
201 Tuner
202 Demultiplexer
203 AV decoder
204 Broadcast-accompanying application execution unit
205 Renderer
206 Display
207 Speaker
208 Media-time management unit
209 Communication unit
210 Communication unit
211 Voice response timing metadata management unit
212 Recording unit
213 Voice response waiting notification unit
301 Microphone
302 Speaker
303 Communication unit
304 Voice response output control unit
305 Timer
306 Buffer
307 Setting management unit
308 Voice analysis unit
309 Communication unit
401 Communication unit
402 Communication unit
403 Voice analysis unit
404 Message generation unit 404-1 Voice generation unit
404-2 Metadata merge unit
501 Communication unit
502 Processing unit
503 Recording unit
1000 Computer
1001 CPU

The invention claimed is:

1. An information processing apparatus, comprising:
processing circuitry configured to control a timing of a voice response upon using a voice AI assistance service in cooperation with content on a basis of an utterance of a viewer,
wherein the processing circuitry is configured to:
upon waiting until the timing of the voice response is reached, cause information indicating a waiting state to be presented; and
upon receiving an instruction to start the voice response from the viewer, cause the voice response in the waiting state to be started.

2. The information processing apparatus according to claim 1,
wherein the processing circuitry is further configured to control the timing of the voice response on a basis of voice response time information is indicating time suitable for the voice response on a playback time axis of the content.

3. The information processing apparatus according to claim 2,
wherein the voice response time information is acquired via communication.

4. The information processing apparatus according to claim 3, wherein
the content is played back by a first device,
the voice response time information is delivered by a second device via communication,
the second device extracts the voice response time information indicating the time suitable for the voice response to the content being played in the first device from metadata including the voice response time information intended for an entirety or a part of time on the playback time axis of the content, and
processing circuitry is configured to control the timing of the voice response on a basis of the voice response time information delivered via communication.

5. The information processing apparatus according to claim 4,
wherein the voice response time information is delivered via communication together with voice data of the voice response using an HTTP response.

6. The information processing apparatus according to claim 2,
wherein the voice response time information is acquired via broadcasting.

7. The information processing apparatus according to claim 6, wherein
the content is played back by a first device,
the voice response time information is delivered by a second device via broadcasting,
the second device delivers metadata including the voice response time information intended for an entirety or a part of time on the playback time axis of the content,
the first device extracts the voice response time information indicating the time suitable for the voice response to the content being played from the metadata delivered via broadcasting, and
the processing circuitry is configured to control the timing of the voice response on a basis of the voice response time information extracted by the first device.

8. The information processing apparatus according to claim 7,
wherein the content is delivered via broadcasting as a stream compliant with MPEG-DASH, and
the voice response time information is delivered via broadcasting using an MPD.

9. The information processing apparatus according to claim 2,
wherein the voice response time information includes, as at least part of the time suitable for the voice response, a time period during which an uttered voice of the content being played is not output.

10. The information processing apparatus according to claim 1, wherein
the processing circuitry is configured to, upon waiting until the timing of the voice response is reached, notify a first device playing back the content of a first message indicating the waiting state,
the first device is configured to cause an icon indicating the waiting state to be displayed on a basis of the notified first message,
the processing circuitry is configured to, upon receiving the instruction to start the voice response from the viewer, notify the first device of a second message indicating that the waiting state of the voice response is released, and
the first device is configured to cause the displayed icon indicating the waiting state to be erased on a basis of the notified second message.

11. The information processing apparatus according to claim 1,
wherein the content is broadcast content delivered via broadcasting, and
the voice response is a response to the utterance of the viewer viewing the broadcast content.

12. The information processing apparatus according to claim 1,
wherein the information processing apparatus is configured as a voice processing device configured to function as a user interface for the voice AI assistance service.

13. The information processing apparatus according to claim 1,
wherein the information processing apparatus is configured as a reception apparatus configured to receive and playback the content delivered via broadcasting.

14. An information processing method executed by an information processing apparatus, the method comprising:
controlling, by the information processing apparatus, a timing of a voice response upon using a voice AI assistance service in cooperation with content on a basis of an utterance of a viewer,
wherein the controlling the timing comprises:
upon waiting until the timing of the voice response is reached, causing information indicating a waiting state to be presented; and
upon receiving an instruction to start the voice response from the viewer, causing the voice response in the waiting state to be started.

15. A transmission apparatus, comprising:
processing circuitry configured to:
generate, upon using a voice AI assistance service in cooperation with content, metadata including voice response time information indicating time suitable for a voice response to an utterance of a viewer; and transmit the generated metadata, wherein upon waiting until timing of the voice response is reached, information indicating a waiting state to be presented is generated, and upon receiving an instruction to start the voice response from the viewer, the voice response in the waiting state starts.

16. The transmission apparatus according to claim 15, wherein the processing circuitry is configured to:

generate an MPD in which the voice response time information intended for an entirety or a part of time on a playback time axis of the content is expressed to be identifiable by identification information being used to identify as being used for the voice AI assistance service; and deliver, together with the MPD, the content as a stream compliant with MPEG-DASH via broadcasting.

17. A transmission method executed by a transmission apparatus, the method comprising:

generating, by the transmission apparatus, upon using a voice AI assistance service in cooperation with content, metadata including voice response time information indicating time suitable for the voice response to an utterance of a viewer watching the content; and transmitting, by the transmission apparatus, the generated metadata, wherein upon waiting until timing of the voice response is reached, information indicating a waiting state to be presented is generated, and upon receiving an instruction to start the voice response from the viewer, the voice response in the waiting state starts.

* * * * *